US012595821B2

(12) United States Patent　　　　(10) Patent No.:　US 12,595,821 B2

Perevozchikov et al.　　　　　　　(45) Date of Patent:　　Apr. 7, 2026

---

(54) FOIL BEARING ASSEMBLY INCLUDING BIDIRECTIONAL ANTI-ROTATION FEATURES AND COMPRESSOR INCLUDING SAME

(71) Applicant: Copeland LP, Sidney, OH (US)

(72) Inventors: Michael M. Perevozchikov, Tipp City, OH (US); Patrick Shawn O'Meara, Tipp City, OH (US)

(73) Assignee: Copeland LP, Sidney, OH (US)

( * ) Notice: Subject to any disclaimer, the term of this patent is extended or adjusted under 35 U.S.C. 154(b) by 137 days.

(21) Appl. No.: 18/617,018

(22) Filed: Mar. 26, 2024

(65) Prior Publication Data

US 2025/0305539 A1　　　Oct. 2, 2025

(51) Int. Cl.
　　F16C 17/02　　　　(2006.01)
(52) U.S. Cl.
　　CPC ........ F16C 17/024 (2013.01); F16C 2360/44 (2013.01); F16C 2362/52 (2013.01)
(58) Field of Classification Search
　　CPC .................................................. F16C 17/024
　　See application file for complete search history.

(56) References Cited

U.S. PATENT DOCUMENTS

| | | | |
|---|---|---|---|
| 4,699,523 A | 10/1987 | Hagemeister | |
| 5,634,723 A | 6/1997 | Agrawal | |
| 5,911,511 A | 6/1999 | Saville | |
| 6,964,522 B2 | 11/2005 | Kang et al. | |

| | | | |
|---|---|---|---|
| 8,353,631 B2 | 1/2013 | Kim | |
| 8,419,283 B2 | 4/2013 | McAuliffe et al. | |
| 8,807,921 B2 | 8/2014 | Struziak | |
| 9,151,322 B2 * | 10/2015 | Heshmat ............... | F16C 37/002 |
| 9,360,042 B2 | 6/2016 | Thompson et al. | |
| 9,556,899 B2 | 1/2017 | Saville et al. | |
| 9,651,086 B2 | 5/2017 | Rimpel | |
| 9,719,556 B2 | 8/2017 | Kim | |
| 10,072,702 B2 | 9/2018 | Dahinten | |

(Continued)

FOREIGN PATENT DOCUMENTS

| | | | | |
|---|---|---|---|---|
| CN | 114087279 A | * | 2/2022 | ............. F16C 35/02 |
| KR | 20230001363 A | | 1/2023 | |

OTHER PUBLICATIONS

Translation of CN114087279 obtained Oct. 8, 2025.*
European Search Report for EP Application No. 25161930.0 dated Aug. 29, 2025, 6 pgs.

*Primary Examiner* — James Pilkington
(74) *Attorney, Agent, or Firm* — Armstrong Teasdale LLP

(57)　　　　　　ABSTRACT

A bearing system includes a housing having an inner surface defining a bore and a slot, and a foil bearing assembly positioned within the bore. The foil bearing assembly includes an outer foil assembly, a bump foil assembly, and an inner foil assembly. The outer foil assembly includes an outer foil extending from a first outer foil end to a second outer foil end, and a first anti-rotation tab at the first outer foil end that is received by the slot to limit circumferential movement of the outer foil in a first direction. The inner foil assembly is secured to the outer foil and includes an inner foil extending from a first inner foil end to a second inner foil end, and a second anti-rotation tab at the second inner foil end that is received by the slot to limit circumferential movement of the inner foil in a second direction.

15 Claims, 19 Drawing Sheets

(56) References Cited

U.S. PATENT DOCUMENTS

| | | | |
|---|---|---|---|
| 10,352,355 | B2 | 7/2019 | McAuliffe et al. |
| 10,487,871 | B2 | 11/2019 | Lee et al. |
| 11,306,726 | B2 * | 4/2022 | Perevozchikov ....... F04D 29/60 |
| 11,441,599 | B2 | 9/2022 | Kim et al. |
| 11,560,922 | B2 | 1/2023 | Aguilar et al. |
| 11,585,374 | B2 | 2/2023 | Tabacchi et al. |
| 11,686,341 | B2 * | 6/2023 | Liu ......................... F16C 43/02 |
| | | | 384/103 |
| 2002/0054718 | A1 | 5/2002 | Weissert |
| 2007/0047858 | A1 | 3/2007 | Hurley et al. |
| 2022/0243762 | A1 | 8/2022 | Liu et al. |

* cited by examiner

FOIL BEARING ASSEMBLY INCLUDING BIDIRECTIONAL ANTI-ROTATION FEATURES AND COMPRESSOR INCLUDING SAME

FIELD

The field relates to bearing systems, and more particularly, to gas or air foil bearing assemblies for use in turbomachines, such as centrifugal compressors, turbochargers, turbine engines, and the like.

BACKGROUND

Turbomachines (e.g., centrifugal compressors) typically include bearings to support a rotor that imparts kinetic energy to incoming working fluid. Turbomachines typically include bearings to support a rotating shaft that transmits power from the motor to an additional rotor component, such as an impeller. The bearings are typically provided with one or more features to improve the robustness of the bearing system. Some bearings in existing turbomachines may use oil or alternative compositions as a lubricant. The lubricant compositions may be incompatible with the working fluid (e.g., refrigerant) used with the turbomachine. Other compressor bearings are oil-free magnetic bearings that levitate the rotor within a magnetic field provided by high-strength magnets. However, magnetic bearings are typically complex in design, add significant weight, require complicated control, and limit the choice of rotor materials to ferromagnetic materials that respond to the magnetic fields within the magnetic bearings. Another type of oil-free bearing is a foil bearing that includes compliant foil elements that surround and support the rotor on a film of fluid (e.g., gas or air). The fluid film is formed between the rotor and the foil elements when the rotation speed of the shaft exceeds a threshold speed termed liftoff speed. Foil bearings may be well-suited for the high-speed operating environment typical of turbomachines, are compatible with various working fluids, including a variety of refrigerant compositions, and may be used with a wide variety of rotor materials.

At least one consideration when using foil bearing assemblies in a turbomachine (e.g., a centrifugal compressor) is preventing movement of the foil elements in a circumferential direction (i.e., rotation of the foil elements) and an axial direction (i.e., telescoping of the foil elements) relative to a bearing housing in which the foil bearing assembly is positioned during rotation of the shaft. There is an ongoing need for improvements in the design of foil bearing assemblies that facilitate limiting or preventing movement of the foil elements of a foil bearing assembly in a cost-effective manner.

This background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect is a bearing system including a bearing housing having an inner surface defining a cylindrical bore, and a slot defined in the inner surface, and a foil bearing assembly positioned within the cylindrical bore. The foil bearing assembly includes an outer foil assembly, a bump foil assembly, and an inner foil assembly. The outer foil assembly includes an outer foil extending circumferentially from a first outer foil end to a second outer foil end, and a first anti-rotation tab at the first outer foil end that is received by the slot to limit circumferential movement of the outer foil relative to the bearing housing in a first direction. The bump foil assembly is positioned radially inward of the outer foil. The inner foil assembly is positioned radially inward of the bump foil assembly and is secured to the outer foil. The inner foil assembly includes an inner foil extending circumferentially from a first inner foil end to a second inner foil end, and a second anti-rotation tab at the second inner foil end that is received by the slot to limit circumferential movement of the inner foil relative to the bearing housing in a second direction opposite the first direction.

Another aspect is a foil bearing assembly including an outer foil assembly, a bump foil assembly, and an inner foil assembly. The outer foil assembly includes an outer foil extending circumferentially from a first outer foil end to a second outer foil end, and a first anti-rotation tab at the first outer foil end. The bump foil assembly is positioned radially inward of the outer foil. The inner foil assembly is positioned radially inward of the bump foil assembly. The inner foil assembly includes an inner foil extending circumferentially from a first inner foil end to a second inner foil end, and a second anti-rotation tab at the second inner foil end. The first inner foil end is secured to the outer foil proximate the first outer foil end.

Another aspect is a compressor including a compressor housing, a shaft rotatably supported within the compressor housing, an impeller connected to the shaft, and a bearing housing mounted within the compressor housing. The bearing housing has an inner surface defining a cylindrical bore through which the shaft extends, and a slot defined in the inner surface. The compressor also includes a foil bearing assembly positioned within the cylindrical bore radially outward of the shaft. The foil bearing assembly includes an outer foil assembly, a bump foil assembly, and an inner foil assembly. The outer foil assembly includes an outer foil extending circumferentially from a first outer foil end to a second outer foil end, and a first anti-rotation tab at the first outer foil end that is received by the slot to limit circumferential movement of the outer foil relative to the bearing housing in a first direction. The bump foil assembly is positioned radially inward of the outer foil. The inner foil assembly is positioned radially inward of the bump foil assembly and is secured to the outer foil. The inner foil assembly includes an inner foil extending circumferentially from a first inner foil end to a second inner foil end, and a second anti-rotation tab at the second inner foil end that is received by the slot to limit circumferential movement of the inner foil relative to the bearing housing in a second direction opposite the first direction.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated embodiments may be incorporated into any of the above-described aspects, alone or in any combination.

BRIEF DESCRIPTION OF THE DRAWINGS

The following figures illustrate various aspects of the disclosure.

Corresponding reference characters indicate corresponding parts throughout the drawings.

DETAILED DESCRIPTION

Figure 1:
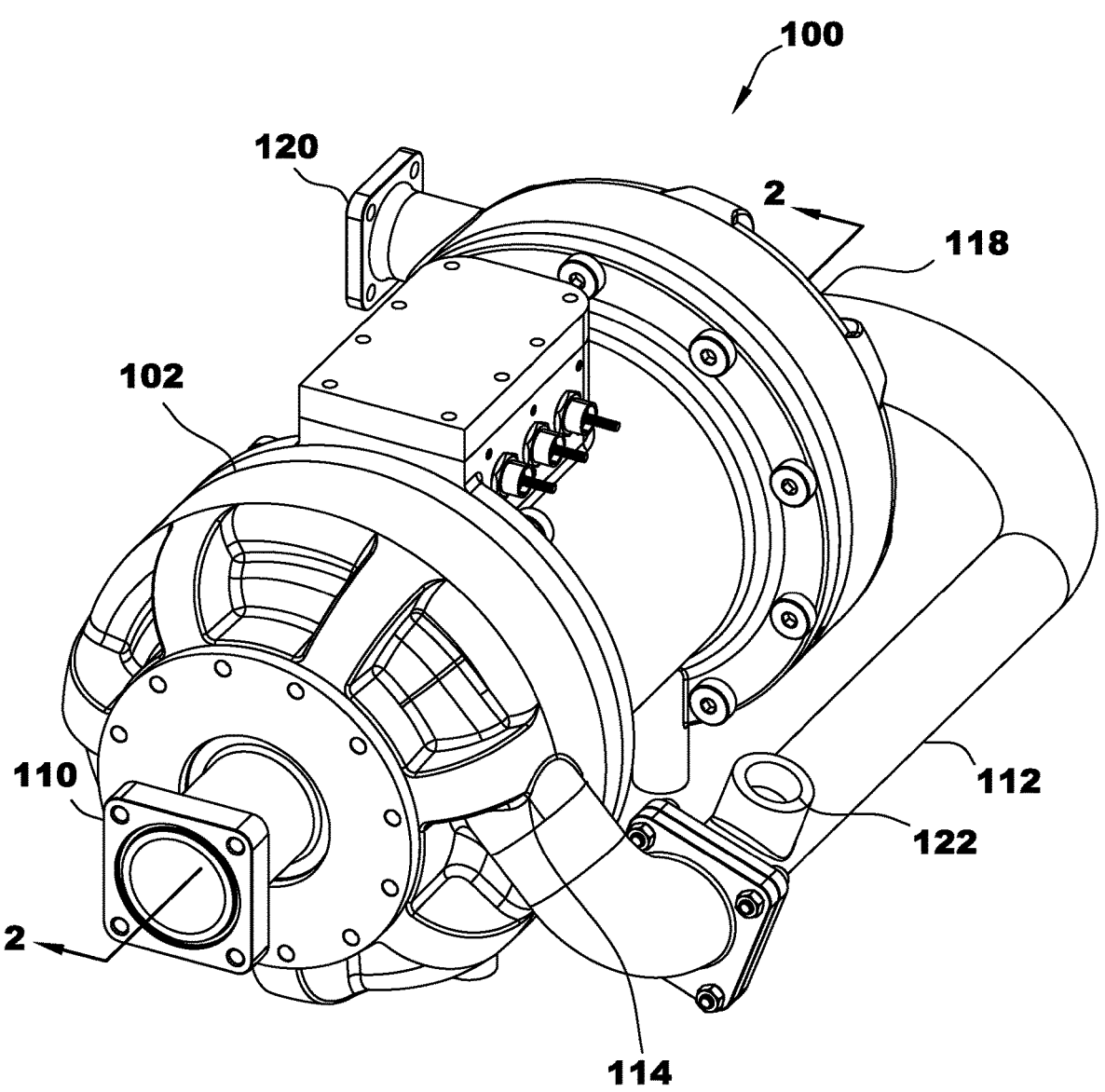
FIG. 1 is a perspective view of an assembled compressor.

Referring to FIG. 1, a turbomachine illustrated in the form of a two-stage refrigerant compressor is indicated at 100. While the refrigerant compressor 100 is described in the examples below, other turbomachines, such as turbine engines, turbochargers, and the like, may also be used and are encompassed by the present disclosure. The compressor 100 includes a compressor housing 102 forming at least one sealed cavity within which each stage of refrigerant compression is accomplished. The compressor 100 includes a first refrigerant inlet 110 to introduce refrigerant vapor into a first compression stage 124 (see FIG. 2), a first refrigerant exit 114, a refrigerant transfer conduit 112 to transfer compressed refrigerant from the first compression stage to the second compression stage, a second refrigerant inlet 118 to introduce refrigerant vapor into a second compression stage 126 (see FIG. 2), and a second refrigerant exit 120. The refrigerant transfer conduit 112 is operatively connected at opposite ends to the first refrigerant exit 114 and the second refrigerant inlet 118, respectively. The second refrigerant exit 120 delivers compressed refrigerant from the second compression stage to a cooling system in which compressor 100 is incorporated. The refrigerant transfer conduit 112 may further include a refrigerant port 122 for introducing an auxiliary stream of refrigerant into the conduit 112, such as from an economizer for example.

Figure 2:
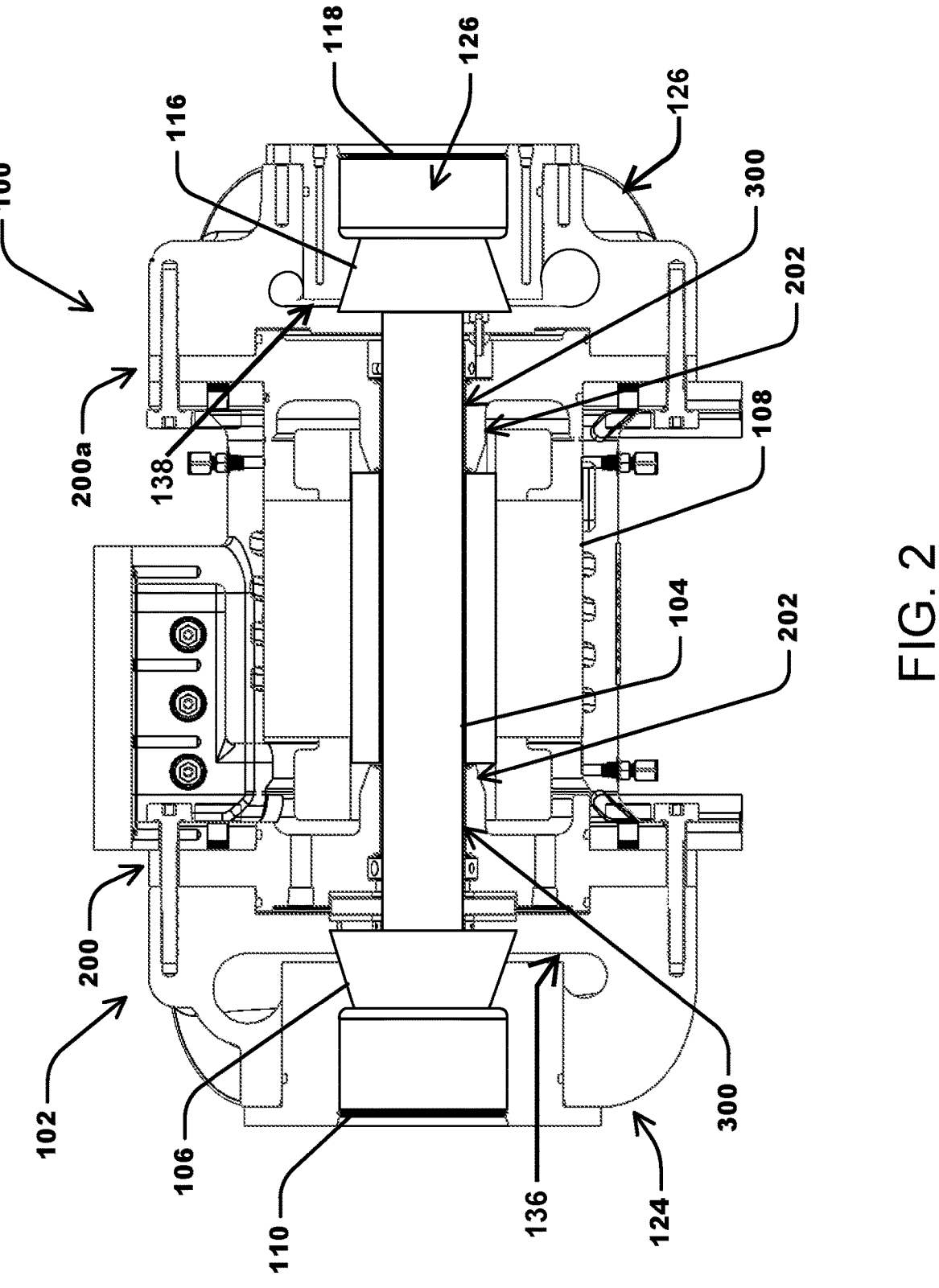
FIG. 2 is a cross-sectional view of the compressor of FIG. 1 taken along line 2-2, with the external conduit removed.

Referring to FIG. 2, the compressor housing 102 encloses the first compression stage 124 and the second compression stage 126 at opposite ends of the compressor 100. The first compression stage 124 includes a first stage impeller 106 operable to impart kinetic energy to working fluid (e.g., refrigerant) entering via the first refrigerant inlet 110. The working fluid is also referred to as refrigerant with reference to the compressor 100. In other examples, and more particularly in other types of turbomachines, the working fluid may include another type of working fluid (e.g., air) depending on the type of turbomachine. The kinetic energy imparted to the refrigerant by the first stage impeller 106 is converted to increased refrigerant pressure (i.e., compression) as the refrigerant velocity is slowed upon transfer to a diffuser 136. Similarly, the second compression stage 126 includes a second stage impeller 116 operable to impart kinetic energy to refrigerant transferred from the first compression stage 124 entering via the second refrigerant inlet 118. The kinetic energy imparted to the refrigerant by the second stage impeller 116 is converted to increased refrigerant pressure (i.e., compression) as the refrigerant velocity is slowed upon transfer to a diffuser 138. Compressed refrigerant exits the second compression stage 126 via the second refrigerant exit 120 (shown in FIG. 1).

Figure 3:
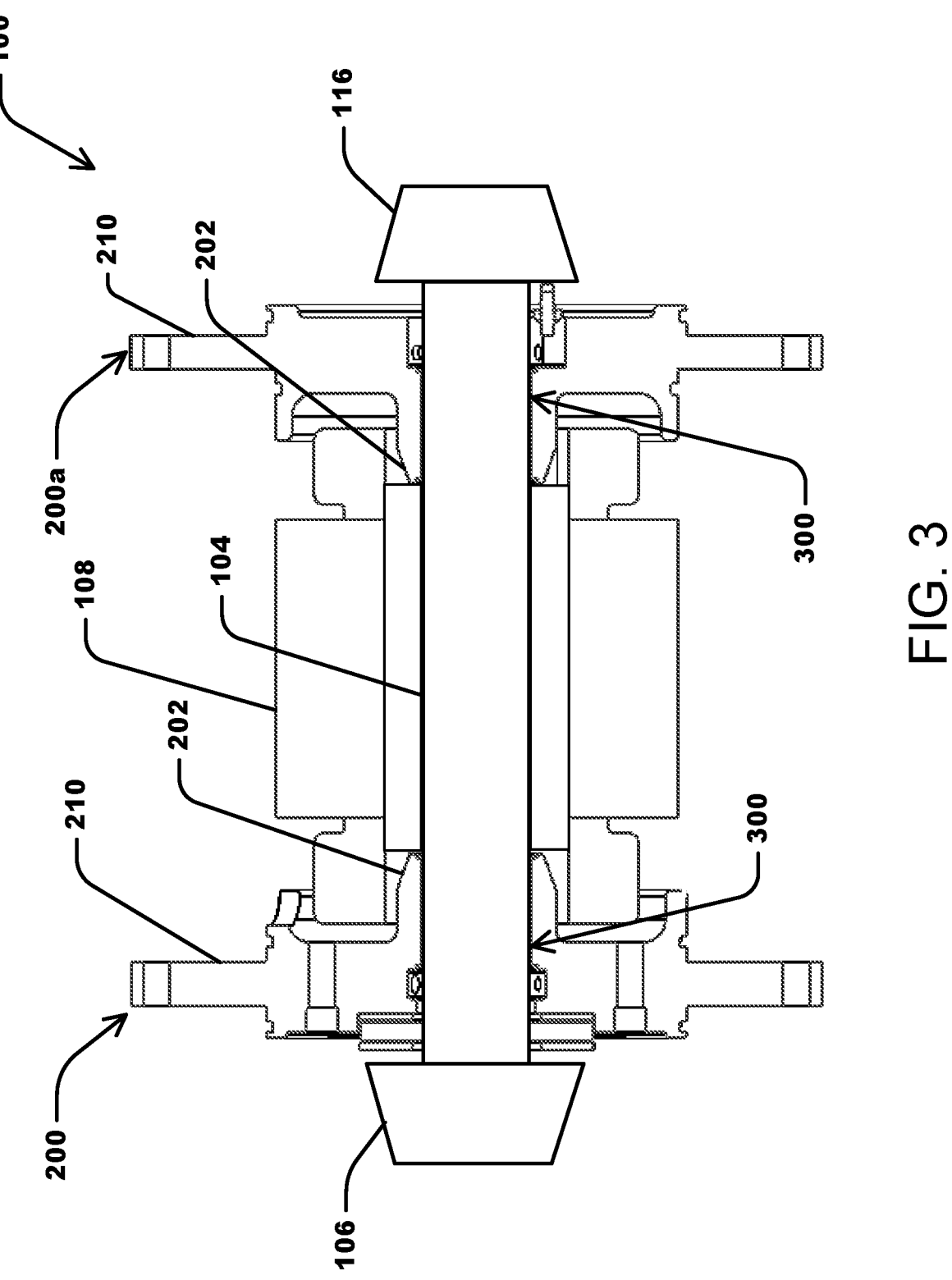
FIG. 3 is a cross-sectional view of the compressor of FIG. 2 with the external compressor housing removed.

Referring to FIG. 2 and FIG. 3, the first stage impeller 106 and second stage impeller 116 are connected at opposite ends of a shaft 104 supported within the compressor housing 102. The shaft 104, the first stage impeller 106, and the second stage impeller 116 may be connected to rotate in unison as a rotor assembly and may be collectively referred to herein as a rotor. The shaft 104 is operatively connected to a motor 108 positioned between the first stage impeller 106 and second stage impeller 116 such that the first stage impeller 106 and second stage impeller 116 are rotated at a rotation speed selected to compress the refrigerant to a pre-selected pressure exiting the second refrigerant exit 120.

Any suitable motor may be incorporated into the compressor 100 including, but not limited to, an electrical motor.

The shaft 104 is rotatably supported by foil bearing assemblies 300. Each foil bearing assembly 300 is positioned within a sleeve 202 of a bearing housing 200, 200a, as described in additional detail below. The bearing housings 200, 200a and the foil bearing assemblies 300 positioned within the bearing housings 200, 200a may be referred to, or included as part of, a bearing system. Each bearing housing 200, 200a includes a mounting structure 210 for connecting the respective bearing housing 200, 200a to the compressor housing 102, as illustrated in FIG. 3. In the example compressor 100, two bearing housings 200, 200a are included, each positioned proximate one of the impeller stages 124, 126. Correspondingly, two foil bearing assemblies 300 are included, each positioned in one of the bearing housings 200, 200a. The number of foil bearing assemblies 300 and bearing housings 200, 200a may vary depending on the configuration and intended application of the compressor 100. For example, there may be one bearing housing 200 and one foil bearing assembly 300, or there may be more than two, such as three, bearing housings 200 and foil bearing assemblies 300.

Figure 4:
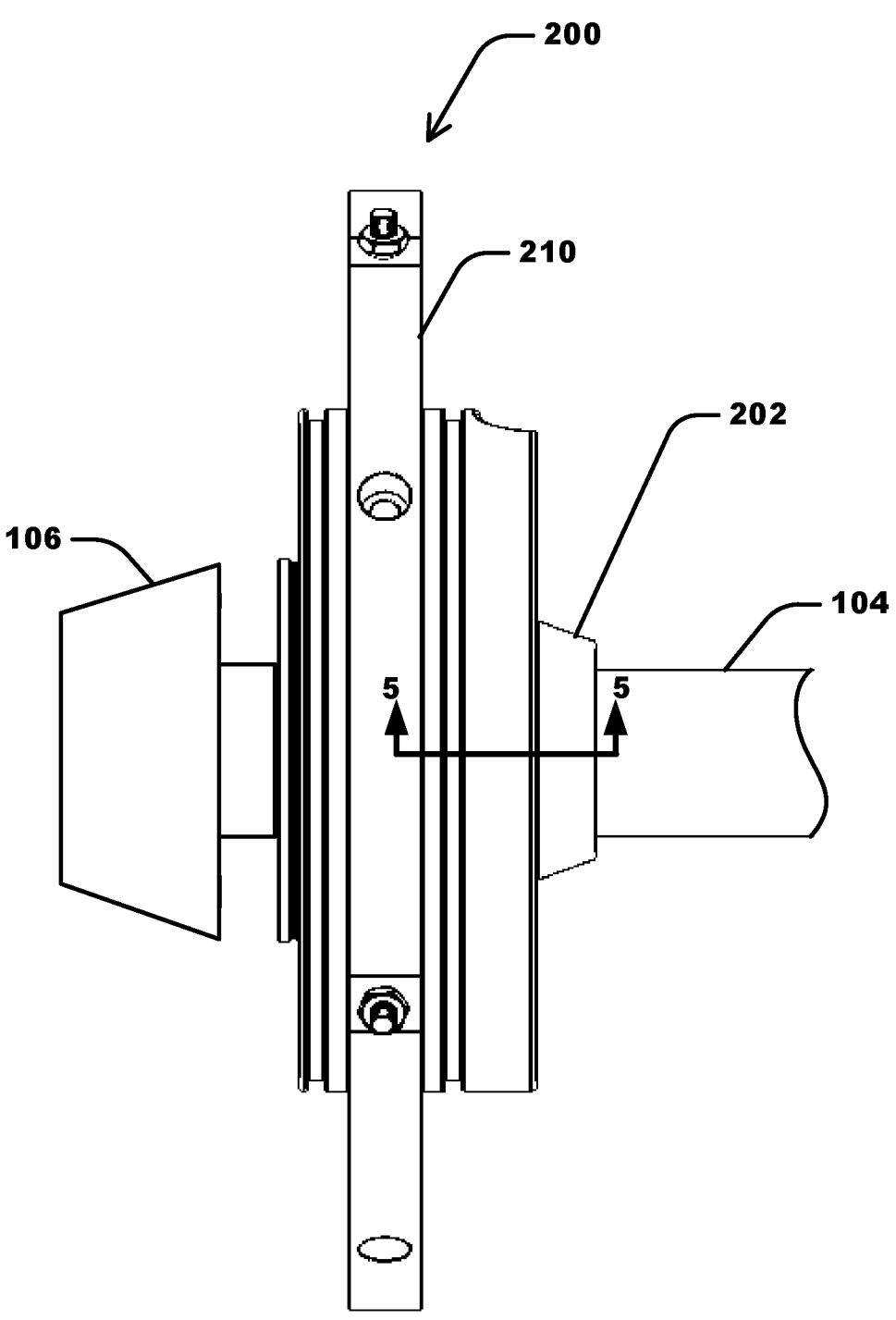
FIG. 4 is a side view of an impeller mounted to an end of a shaft in which the shaft is supported by a bearing housing.

Referring to FIG. 4, each bearing housing 200, 200a (only the bearing housing 200 is illustrated in FIG. 4) supports the shaft 104. The shaft 104 extends through the bearing housings 200, 200a. The two ends of the shaft 104 each project outward from the bearing housings 200, 200a, opposite the sleeves 202. The impellers 106 and 116 (only the first stage impeller 106 is illustrated in FIG. 4) are connected to the projecting ends of the shaft 104. The bearing housings 200, 200a are similar in construction and configuration, and description and illustration of the bearing housing 200 applies equally to the bearing housing 200a unless expressly stated otherwise or the context clearly indicates otherwise.

Figure 5:
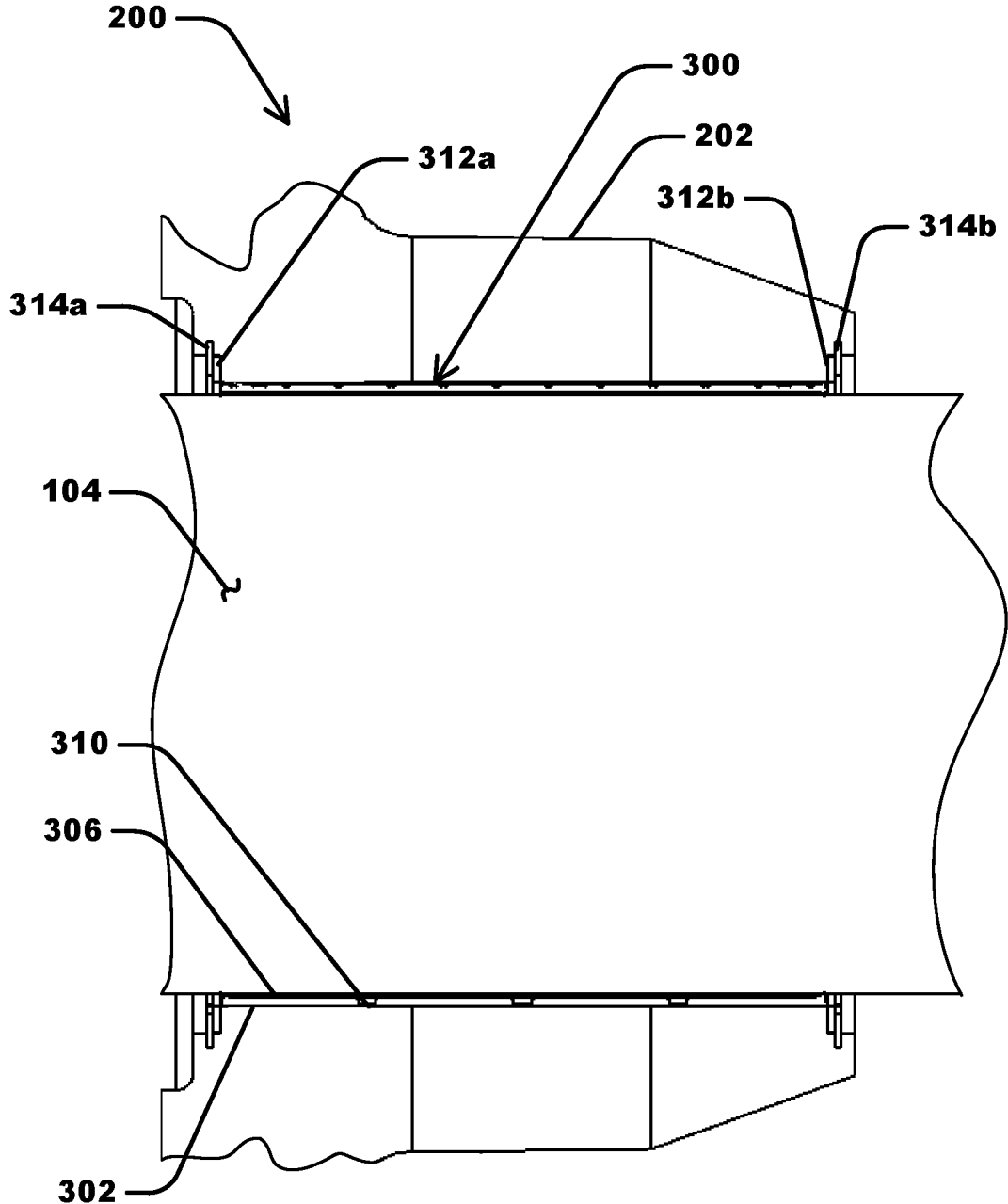
FIG. 5 is a cross-sectional view through a sleeve of the bearing housing shown in FIG. 4 taken along line 5-5, illustrating the shaft rotatably supported within a foil bearing assembly maintained within the sleeve of the bearing housing using a pair of retaining clips.
Figure 7:
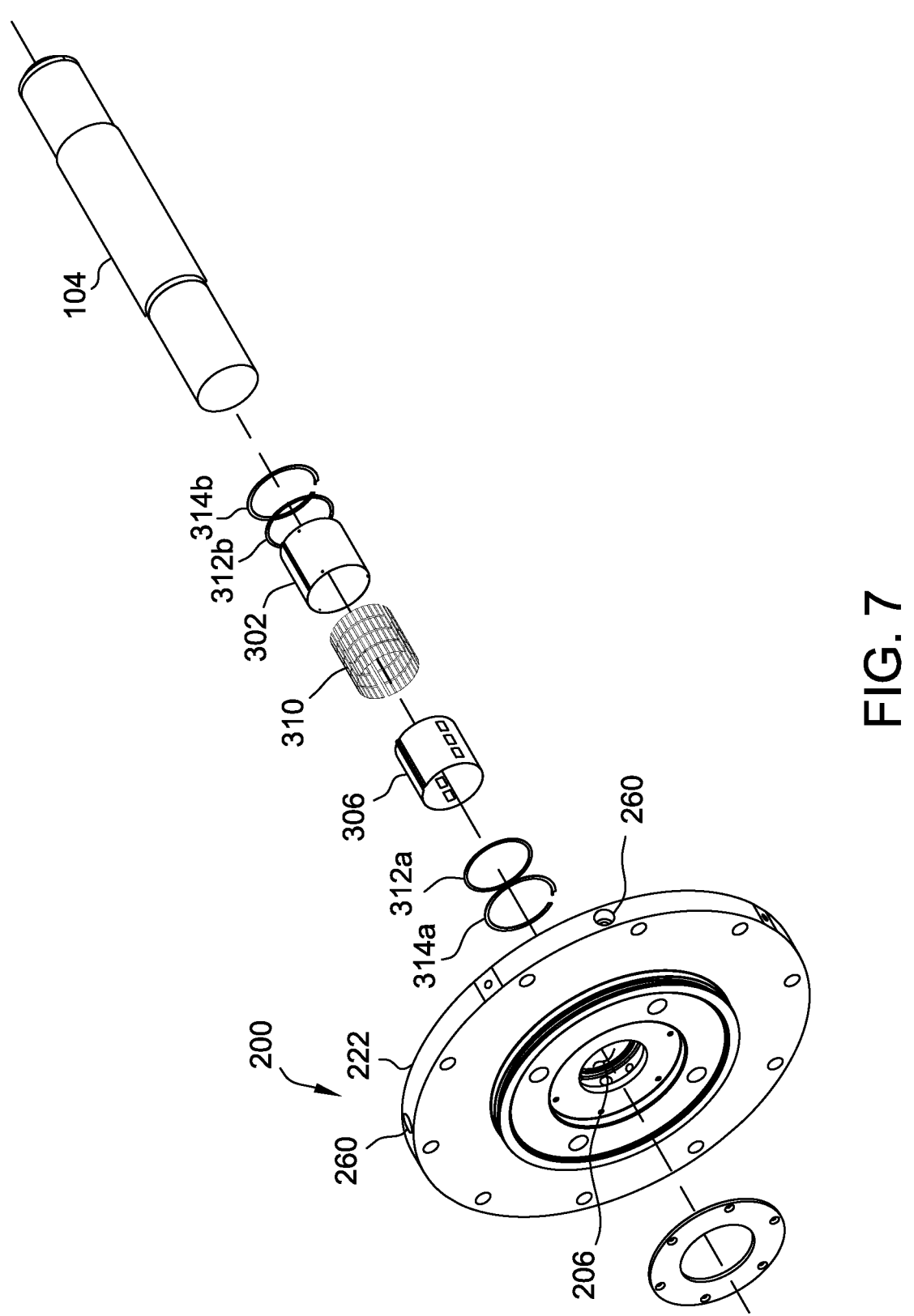
FIG. 7 is an exploded view showing the arrangement of elements of the foil bearing assembly with respect to the bearing housing and the shaft.

Referring to FIG. 5 and FIG. 7, the foil bearing assembly 300 is positioned within a cylindrical bore 206 defined by the bearing housing 200. The shaft 104 fits within the foil bearing assembly 300 such that the shaft 104 is able to rotate relative to the foil bearing assembly 300 and a thin film of gas or air is formed between the shaft 104 and the foil bearing assembly 300 for supporting the rotating shaft 104 during operation of the compressor 100.

The foil bearing assembly 300 includes a compliant outer foil assembly 302 (also referred to as an "outer foil layer" or "bottom foil assembly"), a compliant inner foil assembly 306 (also referred to as an "inner foil layer" or "top foil assembly"), and a bump foil assembly 310. Collectively, the outer foil assembly 302, the inner foil assembly 306, and the bump foil assembly 310 may be referred to as foil assemblies 302, 306, 310 or foil layers or layers 302, 306, 310. The outer foil assembly 302 is the radially outermost layer of the foil bearing assembly 300 and is positioned adjacent to an inner surface 204 of the bearing housing 200 defining the cylindrical bore 206. The inner foil assembly 306 is the radially innermost layer of the foil bearing assembly 300 and is positioned adjacent to the shaft 104. The bump foil assembly 310 is positioned between the inner foil assembly 306 and the outer foil assembly 302. The foil assemblies 302, 306, 310 of the foil bearing assembly 300 form a substantially cylindrical tube sized to receive the shaft 104 with a very small, or essentially non-existent, gap defined therebetween. The size of the gap between the foil bearing assembly 300 and the shaft 104 may be determined by known foil bearing design methods and enables the foil bearing assembly 300 to support the shaft 104 using a thin film of gas or air formed between the shaft 104 and the foil bearing assembly 300 during rotation of the shaft 104.

The components of the foil bearing assembly 300, such as the outer foil assembly 302, the inner foil assembly 306, and the bump foil assembly 310, may be constructed of any suitable material that enables the foil bearing assembly 300 to function as described. Suitable materials include, for example and without limitation, metal alloys. In some examples, each of the outer foil assembly 302, the inner foil assembly 306, and the bump foil assembly 310 is constructed of stainless steel (e.g., 17-4 stainless steel). The foil assemblies 302, 306, 310 can be formed from relatively thin sheets or "foils" of material. For example, the foil assemblies 302, 306, 310 can be constructed of metal sheets having a thickness in the range of 0.003 inches to 0.007 inches.

Figure 8:
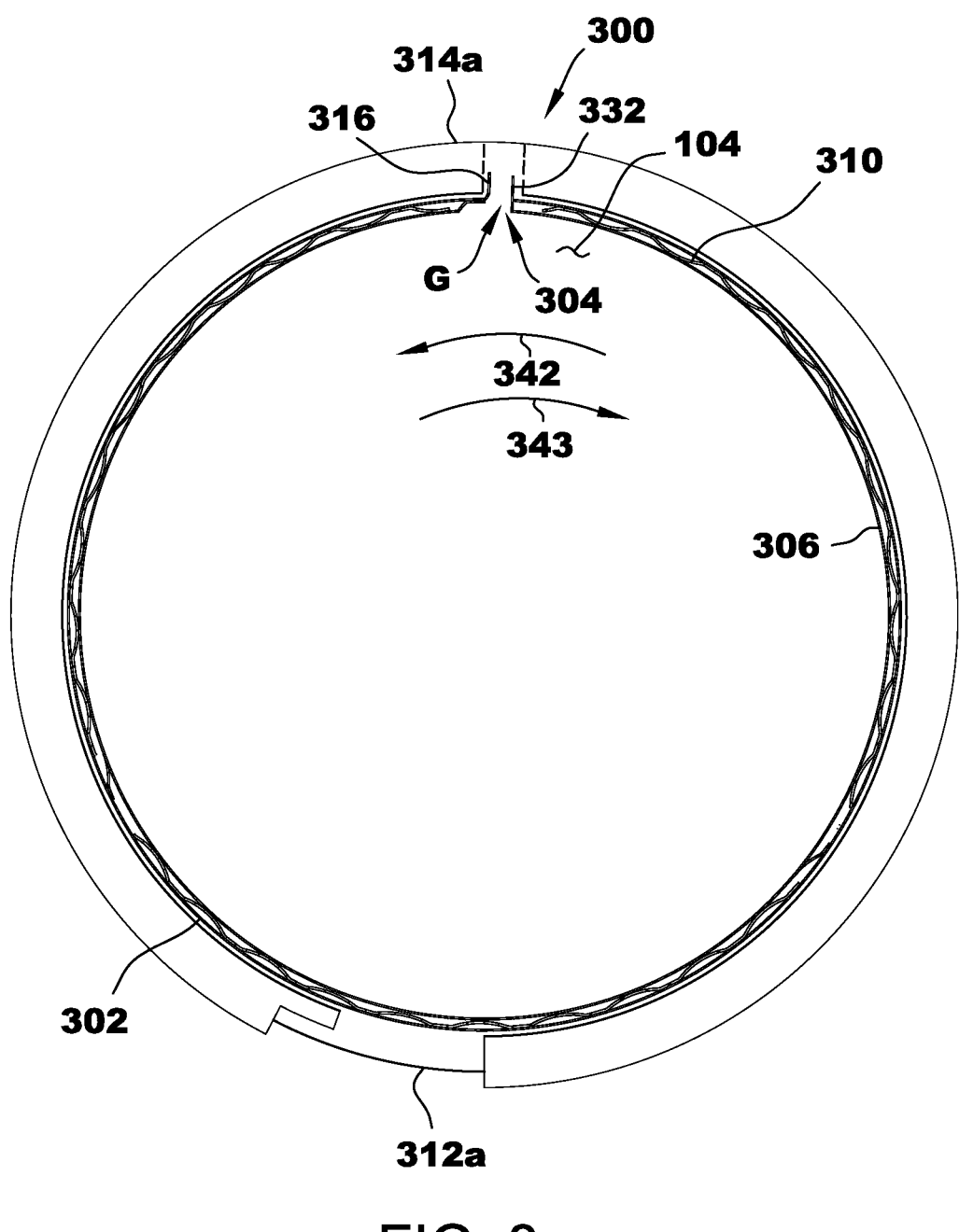
FIG. 8 is a front view of the foil bearing assembly shown in FIGS. 5 and 7, with a portion of the foil keeper and the foil retaining clip omitted to show an overlapped bearing retention feature of the foil bearing assembly.

The foil bearing assembly 300 may be axially supported within the cylindrical bore 206 by retainers positioned at opposite axial ends of the foil bearing assembly 300 to limit or inhibit axial movement of the foil assemblies 302, 306, 310 relative to one another and axial movement of the foil bearing assembly 300 relative to the bearing housing 200. In the example illustrated in FIG. 4, the foil bearing assembly 300 is axially supported within the cylindrical bore 206 by a pair of foil keepers 312a and 312b and a pair of foil retaining clips 314a and 314b. Each foil keeper 312a and 312b is positioned adjacent one axial end of the foil bearing assembly 300, that is, adjacent one axial end of the foil assemblies 302, 306, 310. The foil keepers 312a and 312b operate to limit or inhibit movement or "sliding" of the foil assemblies 302, 306, 310 in an axial direction within the cylindrical bore 206 of the sleeve 202 relative to each other. Each foil retaining clip 314a and 314b is positioned adjacent to one of the foil keepers 312a and 312b, respectively. The foil retaining clips 314a and 314b operate to maintain the axial position of the foil keepers 312a and 312b and the foil assemblies 302, 306, 310 within the cylindrical bore 206, and to limit or inhibit axial movement of the foil bearing assembly 300 and the foil keepers 312a and 312b relative to the bearing housing 200. The foil retaining clips 314a and 314b may be removably connected to bearing housing 200. For example, the foil retaining clips 314a and 314b may be each received by and snap into one of two circumferential grooves 212a, 212b (FIG. 13) defined at the axial ends of the radial inner surface 204. FIG. 8 further illustrates the arrangement of the foil keeper 312a and foil retaining clip 314a at one axial end of the foil bearing assembly 300.

Figure 6:
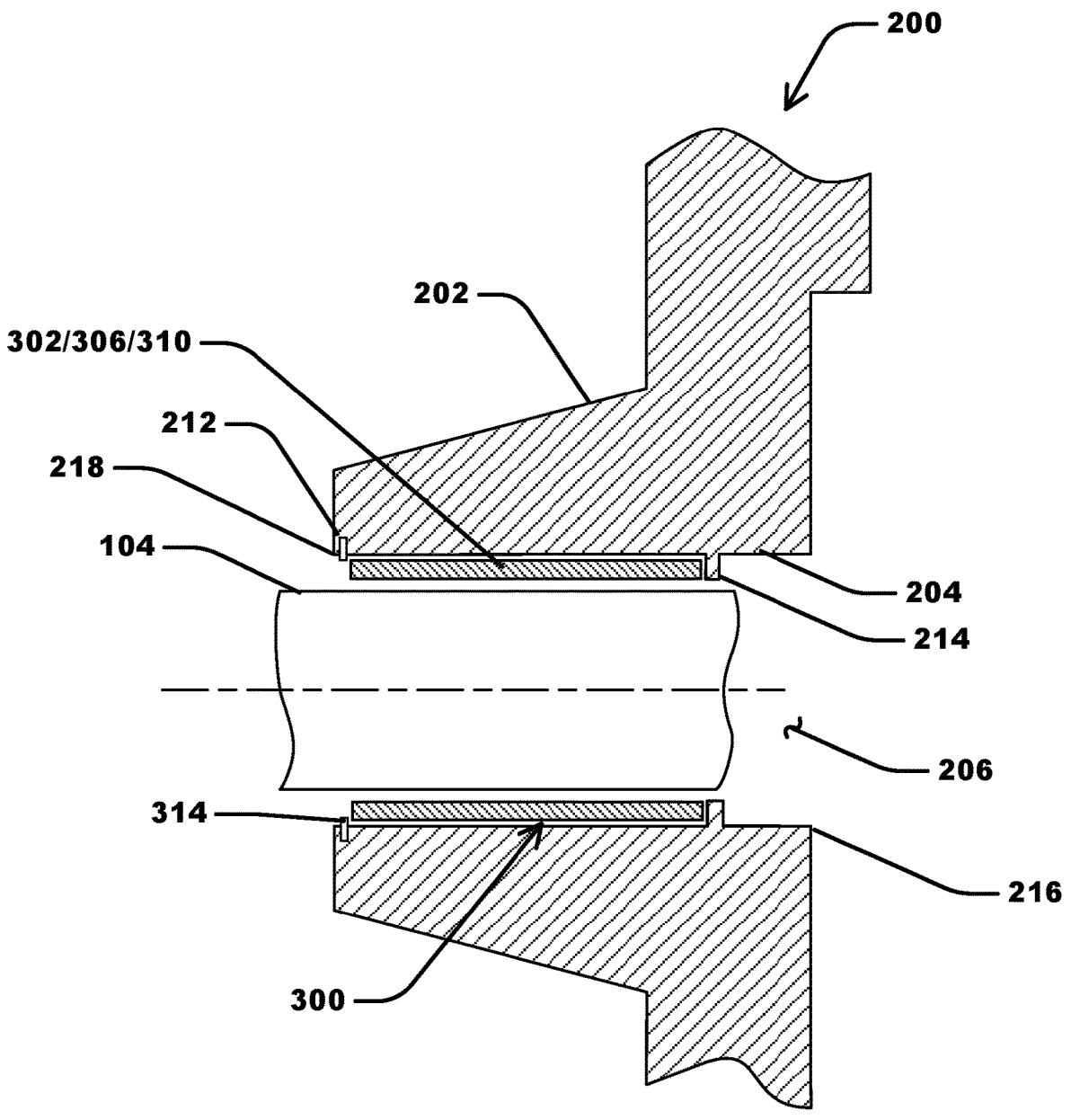
FIG. 6 is a cross-sectional view of another example of a bearing housing suitable for use in the compressor of FIG. 1, illustrating the shaft supported within a foil bearing assembly maintained within the bearing housing between a retaining lip formed within the bearing housing at one end and a retaining clip at an opposite end.

FIG. 6 depicts another example of retainers that may be included to limit or inhibit axial movement of the foil bearing assembly 300 as described above. In this example, each bearing housing 200, 200a (only bearing housing 200 is illustrated in FIG. 6) includes a foil retaining lip 214 projecting radially inward from the radial inner surface 204 that defines the cylindrical bore 206. The retaining lip may be made integral (e.g., cast) with the bearing housing 200 or may be a separate component attached to the inner surface 204. The foil retaining lip 214 is positioned proximate an impeller end 216 of the cylindrical bore 206 which faces the first stage impeller 106 (shown in FIGS. 2-4). The foil retaining lip 214 is sized and dimensioned to project a radial distance from the radial inner surface 204 that overlaps at least a portion of the layers 302, 306, 310 of the foil bearing assembly 300. The foil retaining lip 214 may extend entirely around the circumference of the radial inner surface 204, or the foil retaining lip 214 may include two or more segments extending over a portion of the circumference of the radial inner surface 204 and separated by spaces flush with the adjacent radial inner surface 204.

Figure 9:
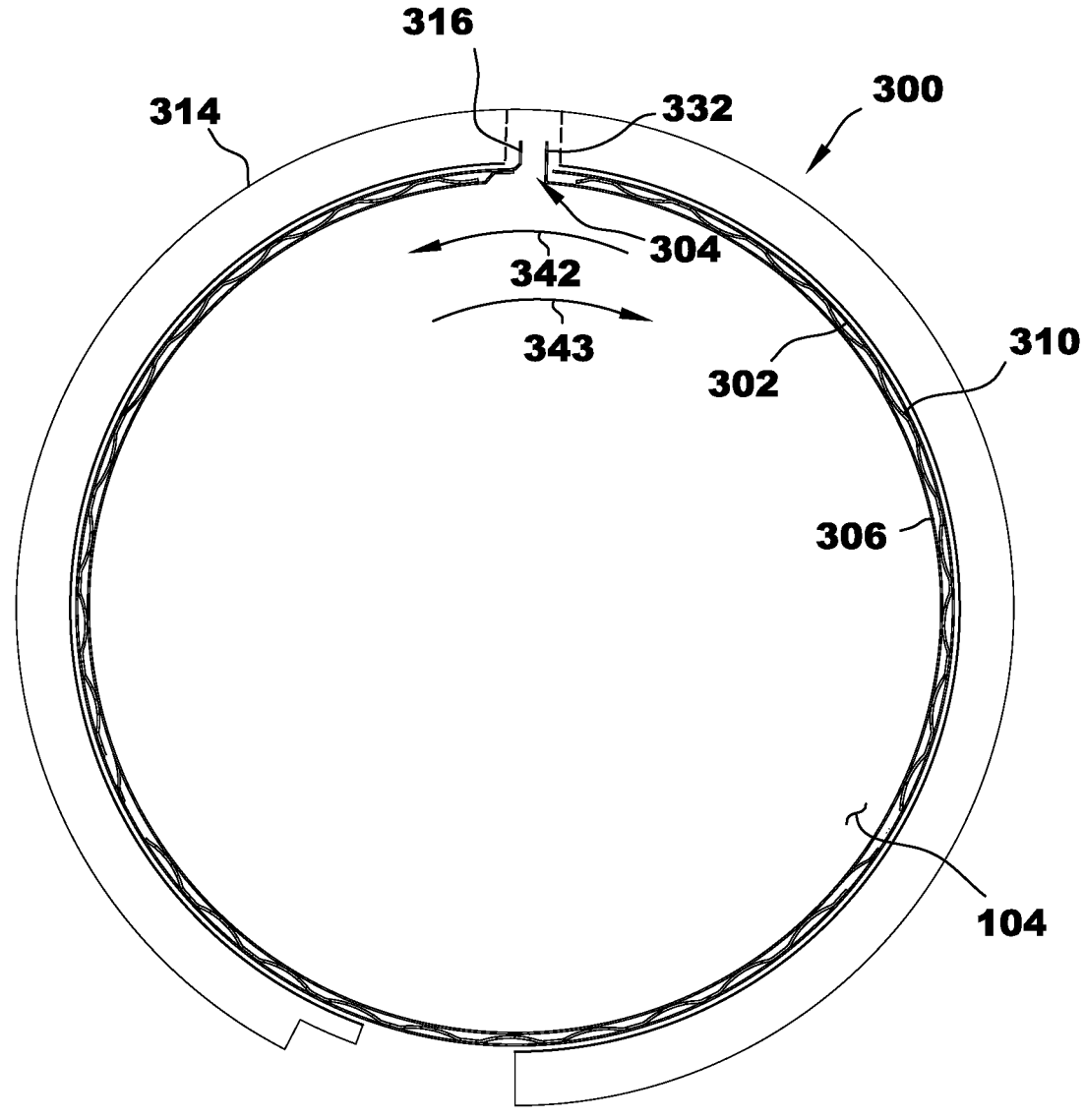
FIG. 9 is a front view of the foil bearing assembly shown in FIGS. 6 and 7 with a portion of the foil retaining clip omitted to show an overlapped bearing retention feature of the foil bearing assembly.
Figure 10:
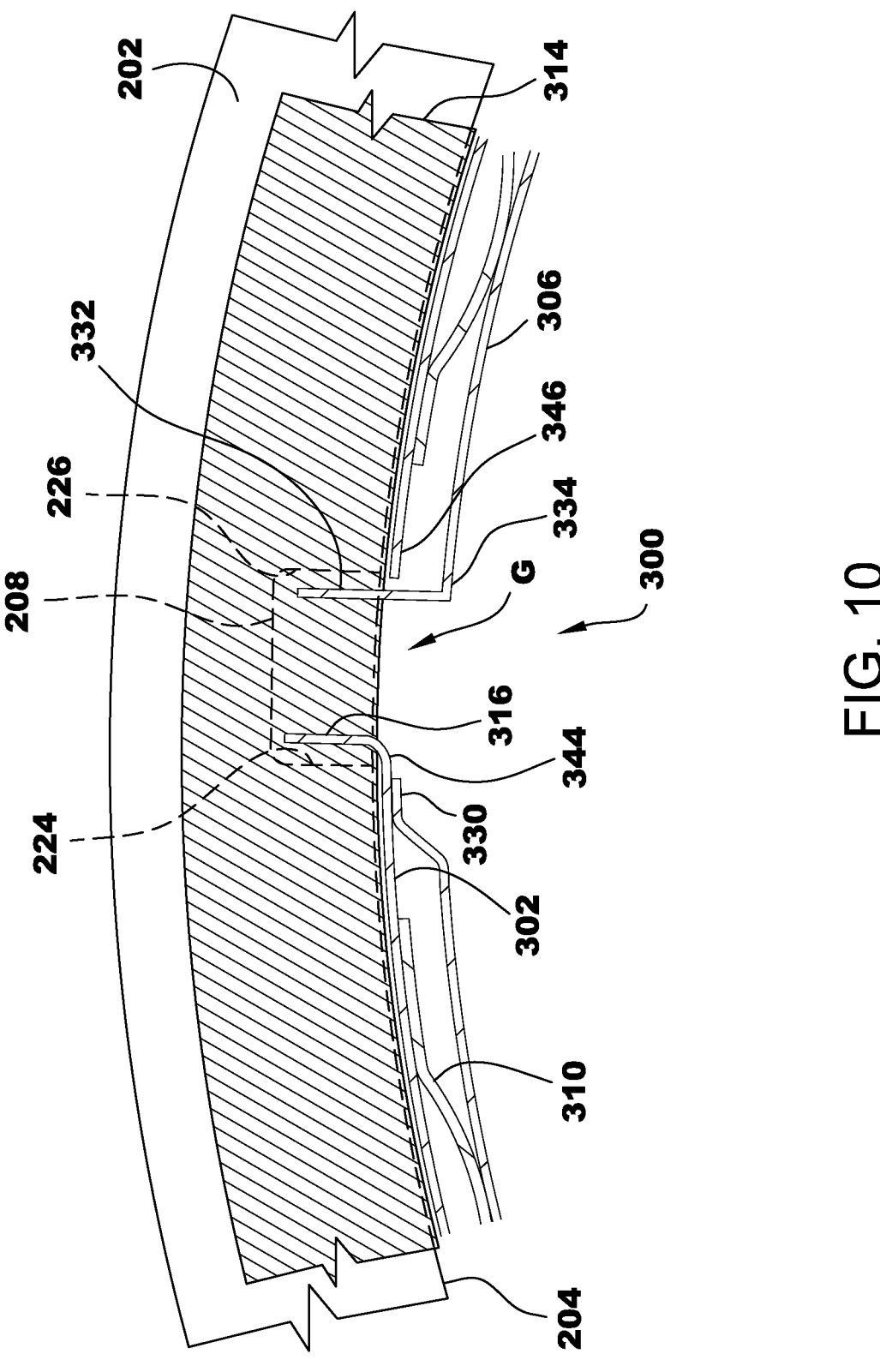
FIG. 10 is an enlarged view of the foil bearing assembly shown in FIG. 9.

Still referring to FIG. 6, in this example, axial movement of the foil bearing assembly 300 within the cylindrical bore 206 is limited or inhibited at one axial end by the foil retaining lip 214 and at the other axial end by a foil retaining clip 314. The foil retaining clip 314 is positioned adjacent the ends of the layers 302, 306, 310 opposite the foil retaining lip 214. In this example, the foil retaining clip 314 snaps into a circumferential groove 212 defined within the radial inner surface 204 of the cylindrical bore 206 proximate a motor end 218 of the cylindrical bore 206. FIG. 9 and FIG. 10 further illustrate the arrangement of the foil retaining clip 314 at one axial end of the foil bearing assembly 300. The foil retaining clip 314 is sized and dimensioned to provide clearance for the outer foil assembly 302, and to overlap with at least one bearing retention feature 304 of the foil bearing assembly 300. The bearing retention feature 304 is described below.

The foil retaining lip 214 may be positioned within any region of the cylindrical bore 206 near the impeller end 216 including, without limitation, a position immediately adjacent to the opening of the cylindrical bore 206 at the impeller end 216. Alternatively, the foil retaining lip 214 may be positioned within any region of the cylindrical bore 206 near the motor end 218 including, without limitation, a position immediately adjacent to the opening of the cylindrical bore 206 at the motor end 218. In the latter examples, the foil retaining clip 314 snaps into a circumferential groove 212 formed within the radial inner surface 204 of the cylindrical bore 206 proximate the impeller end 216, in an arrangement that is essentially the opposite of the arrangement illustrated in FIG. 6.

Still referring to FIG. 6, the foil bearing assembly 300 is installed within the bearing housing 200 by inserting the foil bearing assembly 300 into the cylindrical bore 206 of the bearing housing 200. The foil bearing assembly 300 is inserted via the motor end 218 in the illustrated example, but may be inserted via the impeller end 216 depending on the location of the foil retaining lip 214. The foil bearing assembly 300 is then advanced axially into the cylindrical bore 206 toward the impeller end 216 (or, alternatively, the motor end 218) until the layers 302, 306, 310 contact the foil retaining lip 214. The foil retaining clip 314 is then snapped into the circumferential groove 212 near the motor end 218 (or, alternatively, the impeller end 216) of the cylindrical bore 206 to lock the foil bearing assembly 300 in position.

The retainers described above with reference to FIGS. 5-7 may be substituted with any suitable retainers for maintaining the axial position, and limiting or inhibiting axial movement, of the foil bearing assembly 300 within the cylindrical bore 206. Non-limiting examples of suitable retainers include keepers and retaining clips, adhesives, set screws, and the like.

Figure 11:
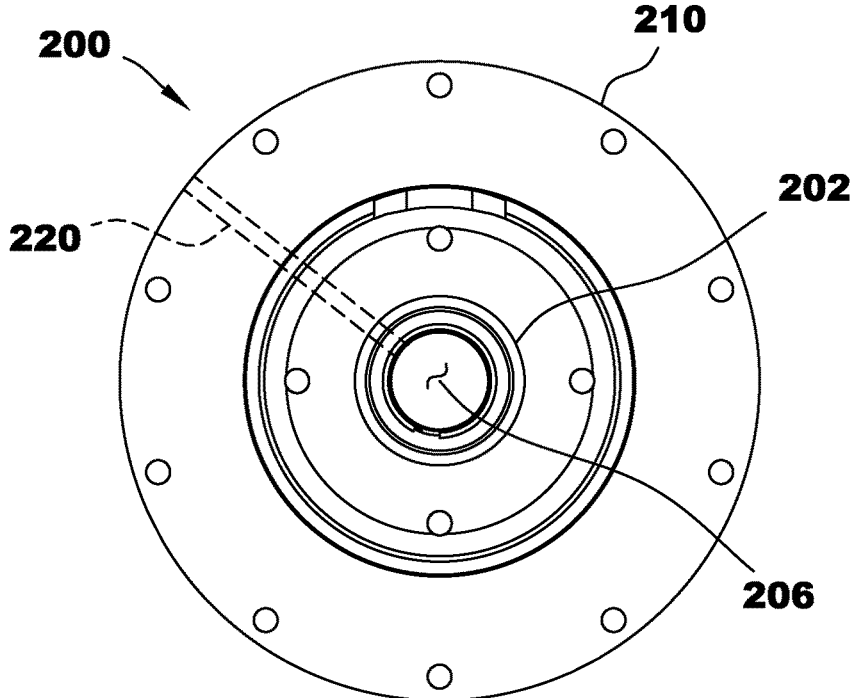
FIG. 11 is a rear view of the bearing housing shown in FIG. 7.
Figure 12:
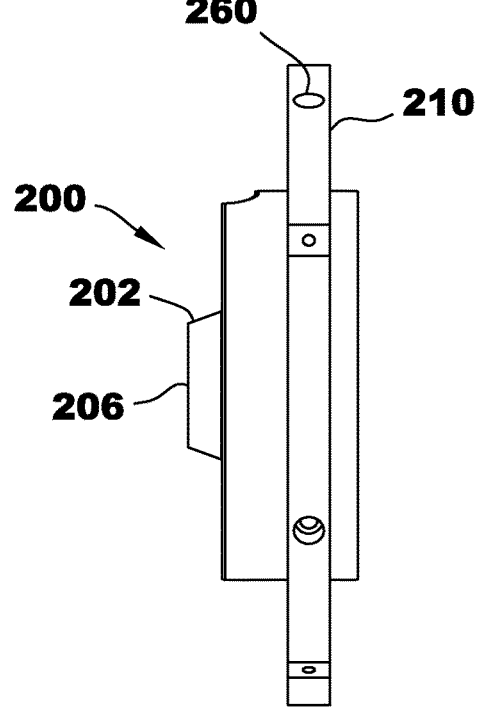
FIG. 12 is a side view of the bearing housing shown in FIG. 7.
Figure 13:
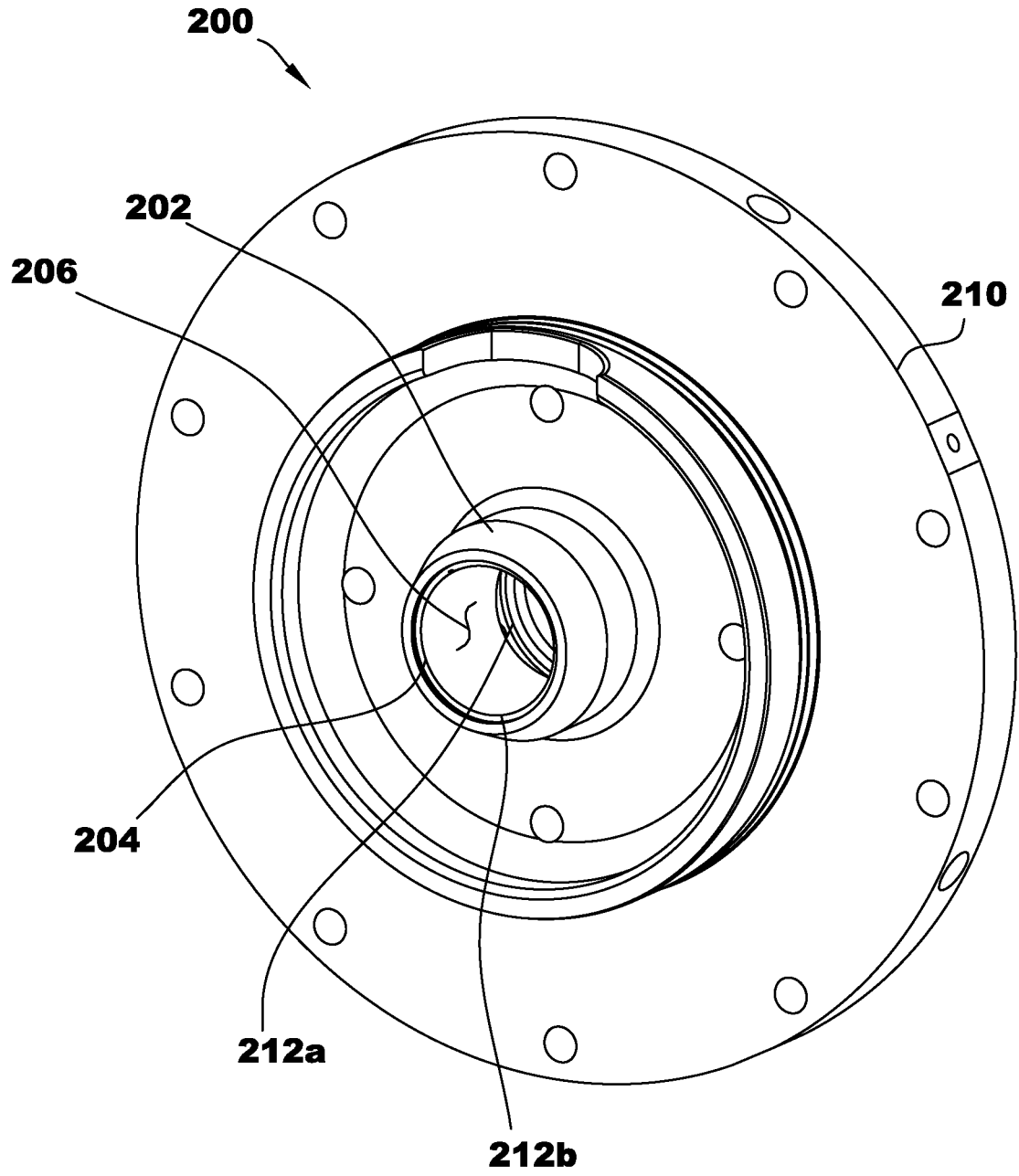
FIG. 13 is a perspective view of the bearing housing shown in FIG. 7.

Referring to FIG. 11, FIG. 12, and FIG. 13, the mounting structure 210 of each bearing housing 200, 200a (only bearing housing 200 is illustrated in FIG. 11, FIG. 12, and FIG. 13) connects the respective bearing housing 200, 200a to the compressor housing 102 (shown in FIGS. 1 and 2). In the illustrated example, the mounting structure 210 projects in a radially outward direction to a dimension that complements the outer dimension of the compressor housing 102. The bearing housing 200 may include any form of mounting structure 210 including, without limitation, an annular flange. The bearing housings 200, 200a may further serve as a mounting structure for a variety of elements including, but not limited to, radial bearings, such as the foil bearing assembly 300 described above, a thrust bearing, and sensing devices (not shown) used as feedback for passive or active control schemes such as proximity probes, pressure transducers, thermocouples, key phasers, and the like.

The bearing housing 200 may also include external coolant conduits or channels 220 (shown in FIG. 11) to enable a cooling of the foil bearing assembly 300 within the cylindrical bore 206. The coolant channels 220 may extend, for example, radially outward from the cylindrical bore 206 to an opening 260 formed at a radial outer edge 222 of the bearing housing 200, 200a (see also FIG. 7). The coolant channels 220 deliver coolant from an external source and/or from the refrigerant system flow to the bearing housing 200, 200a and foil bearing assembly 300. Additional details of coolant channels and coolant delivery methods suitable for use with the compressor 100 are described, for example, in U.S. patent application Ser. No. 16/809,836, filed Mar. 5, 2020, issued as U.S. Pat. No. 11,306,726 on Apr. 19, 2022, the disclosure of which is incorporated by reference in its entirety.

Figure 14:
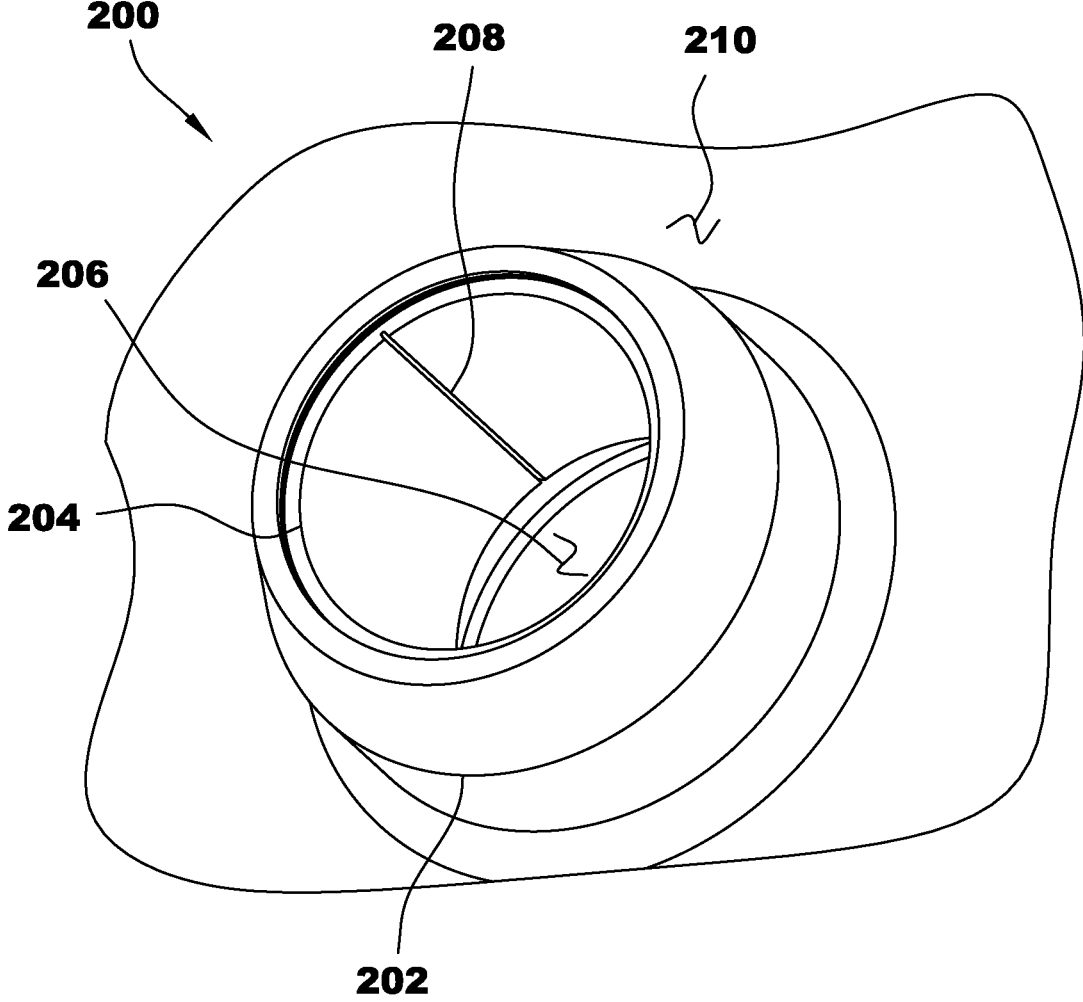
FIG. 14 is an enlarged view of the sleeve of the bearing housing shown in FIG. 10, illustrating the bearing assembly locking feature.

Referring to FIG. 13 and FIG. 14, the bearing housing sleeve 202 has the radial inner surface 204 that defines the cylindrical bore 206. The cross-sectional profile of the cylindrical bore 206 may be substantially circular or may be any other rounded or polygonal shape such as, for example and without limitation, elliptical, square, octagonal, and the like. The radial inner surface 204 is sized and dimensioned to receive the foil bearing assembly 300 such that the outer foil assembly 302 of the foil bearing assembly 300 engages the radial inner surface 204.

The radial inner surface 204 may include one or more additional features to facilitate retaining the foil bearing assembly 300 in a fixed axial and rotational position within the sleeve 202. In the illustrated example, the first circumferential groove 212a and the second circumferential groove 212b are defined at the opposite axial ends of the radial inner surface 204. The first and second circumferential grooves 212a, 212b are sized and dimensioned to receive the foil retaining clips 314a and 314b, respectively, illustrated in FIG. 5 and described above. In other examples, one or both of the first and second circumferential grooves 212a, 212b may be omitted in lieu of one or two circumferential foil retaining lips 214 (see FIG. 6) of the inner surface 204.

Referring to FIGS. 7-17, the foil bearing assembly 300 may be provided in any suitable form without limitation. For example, the foil bearing assembly 300 may be provided with two foils or "layers", three layers, four layers, or additional layers without limitation.

The outer foil assembly 302 includes at least one outer foil pad 318, also referred to as an outer foil 318, circumferentially disposed about the bump foil assembly 310 and the inner foil assembly 306. In the examples illustrated in FIGS. 1-17, the outer foil assembly 302 includes a single outer foil pad 318 constructed of a single, unitary foil. In other examples, the outer foil assembly 302 may be constructed of multiple (i.e., two or more) outer foil pads spaced circumferentially about the foil bearing assembly 300. Reference made to "outer foil pad" or "outer foil" using singular articles (e.g., "an" or "the") encompasses one outer foil pad 318 or multiple outer foil pads 318 being included in the outer foil assembly 302 unless expressly stated otherwise or the context clearly indicates otherwise. Reference made to an outer foil "assembly" encompasses a single unit outer foil assembly in which components of the outer foil assembly are made integral with one another, and a multi-unit outer foil assembly made of two or more separate components.

The outer foil assembly 302, and more particularly the outer foil 318, extends from a first outer foil end 344 to a second outer foil end 346. The outer foil 318 has a circumferential extent that is less than 360° such that a gap G is defined between the first outer foil end 344 and the second outer foil end 346. As described below, the outer foil assembly 302 includes a radially outward projecting, and axially extending, anti-rotation tab 316 at one of the outer foil ends 344, 346, and the anti-rotation tab 316 extends into a bearing assembly locking feature 208 of the bearing housing 200. The other outer foil end 344, 346 may be free-floating and not secured to any layer of the foil bearing assembly 300. Alternatively, the other outer foil end 344, 346, and/or another portion of the outer foil 318, may be secured (e.g., welded, brazed, or adhered) to another layer of the foil bearing assembly 300.

The outer foil assembly 302 provides a relatively smooth inner surface for support of the adjacent bump foil assembly 310 for efficient transmission of transient motions caused by radial forces exerted by the shaft 104 to the inner foil assembly 306 during operation of the compressor 100. The outer foil assembly 302 provides the smooth inner surface independent of the surface smoothness of the underlying radial inner surface 204 of the cylindrical bore 206 of the bearing housing 200. The radial inner surface 204 may thereby have a relatively larger surface roughness than the inner surface of the outer foil assembly 302 without negatively impacting the function of the foil bearing assembly 300. Thus, the outer foil assembly 302 may facilitate increasing the surface specification of the radial inner surface 204 of the cylindrical bore 206 or, stated another way, reducing a surface smoothness requirement of the radial inner surface 204. The foil bearing assembly 300 may be suitable for use with a bearing housing 200 in an "as-cast" condition without need for further machining, grinding, or any other means to smooth the radial inner surface 204 of the cylindrical bore 206 of the bearing housing 200. Accordingly, in some examples, the radial inner surface 204 of the cylindrical bore 206 is an as-cast surface. That is, the radial inner surface 204 of the cylindrical bore 206 is a surface of a cast bearing housing 200 that has not undergone post-cast machining, grinding, or similar techniques to smooth the radial inner surface 204.

The outer foil assembly 302 may also facilitate improving thermal management of the foil bearing assembly 300 and facilitate reducing space requirements of the foil bearing assembly 300, as described for example in U.S. patent application Ser. No. 16/809,836, filed Mar. 5, 2020, issued as U.S. Pat. No. 11,306,726 on Apr. 19, 2022, which is incorporated by reference in its entirety.

The bump foil assembly 310 of the foil bearing assembly 300 is formed from a radially elastic structure to provide a resilient surface for the rotating shaft 104 during operation of the compressor 100. The bump foil assembly 310 may be formed from any suitable radially elastic structure without limitation including, but not limited to, an array of deformable bumps or other features designed to deform and rebound under intermittent compressive radial loads, and any other elastically resilient material capable of compressing and rebounding under intermittent compressive radial loads. The bump foil assembly 310 may be secured within the foil bearing assembly 300, that is, secured to at least one adjacent layer of the foil bearing assembly 300. The bump foil assembly 310 may be secured to the adjacent layer(s) using any suitable technique to join materials, such as welding, brazing, adhesives, and the like. As used in this description, "welding" refers to any suitable welding technique and includes, without limitation, resistance welding (e.g., spot welding), laser welding, and ultrasonic welding. In some examples, the bump foil assembly 310 is secured to the outer foil assembly 302 and/or the inner foil assembly 306. In other examples, the bump foil assembly 310 may be free-floating and not secured (e.g., not welded, brazed, or adhered) to any layer of the foil bearing assembly 300.

Figures 15, 16:
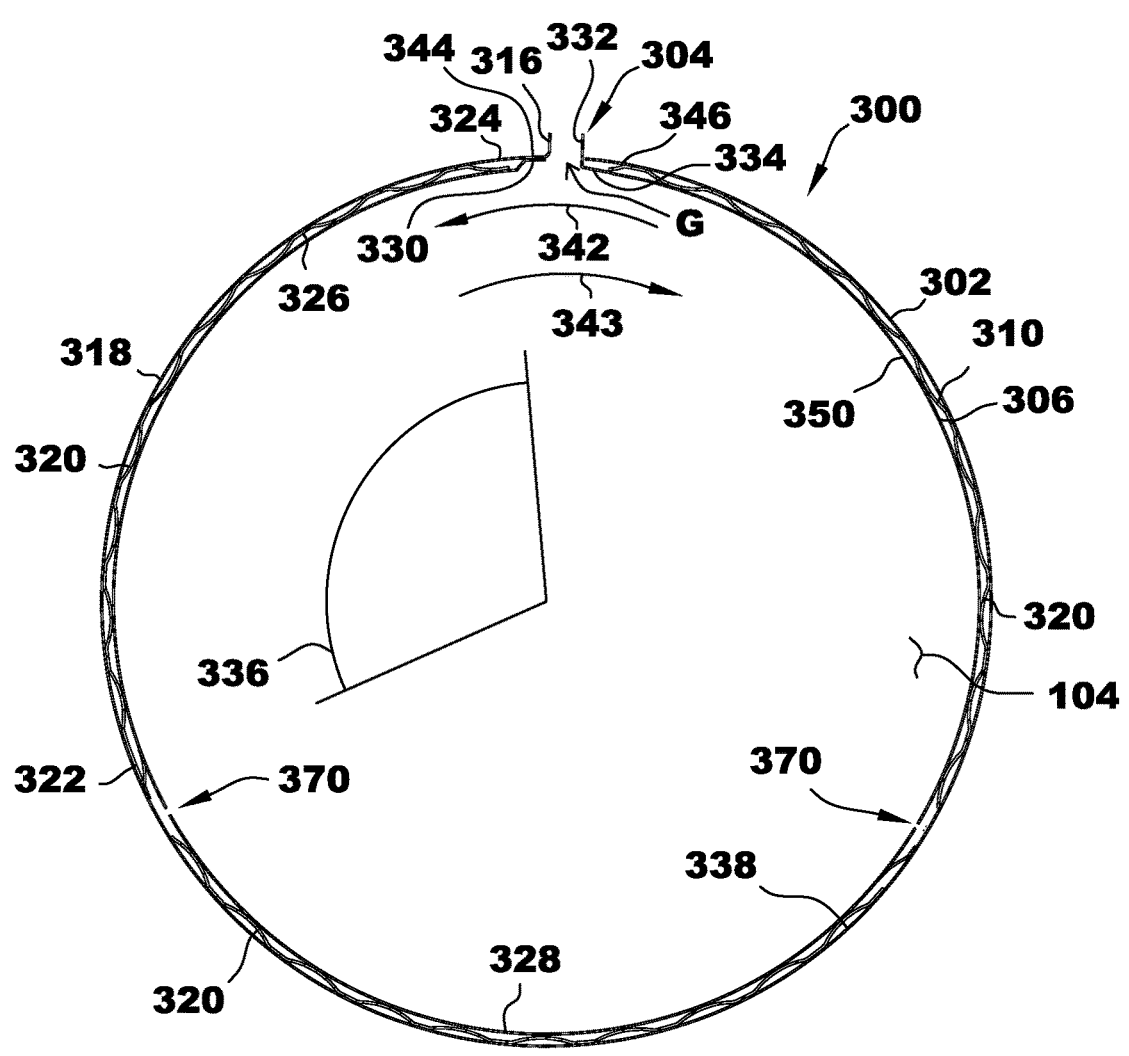
FIG. 15 is a section of the foil bearing assembly shown in FIG. 8 with the foil keeper and foil retaining clip removed.
FIG. 16 is an enlarged view of the foil bearing assembly shown in FIG. 15, illustrating various features of the foil bearing assembly in more detail.

As shown in FIG. 15, the bump foil assembly 310 includes one or more bump foils 320 disposed circumferentially about the foil bearing assembly 300. Adjacent bump foils 320 may be circumferentially spaced apart to define gaps 325 therebetween, described below with reference to FIG. 18. The bump foil assembly 310 illustrated in FIG. 15 includes three bump foils 320, though the bump foil assembly 310 may include any other suitable number of bump foils 320 that allows the foil bearing assembly 300 to function as described herein, such as, for example and without limitation, one, two, four, or more than four bump foils. Reference made to "bump foil" using singular articles (e.g., "a" or "the") encompasses one bump foil 320 or multiple (i.e., two or more) bump foils 320 being included in the bump foil assembly 306 unless expressly stated otherwise or the context clearly indicates otherwise. In examples where the bump foil assembly 310 includes multiple bump foils 320, the bump foils may be referred to as bump foil segments 320. Reference made to a bump foil "assembly" encompasses a single unit bump foil assembly in which components of the bump foil assembly are made integral with one another, and a multi-unit bump foil assembly made of two or more separate components.

Each bump foil 320 extends axially the entire length or substantially the entire length of the foil bearing assembly 300 and extends circumferentially from a first edge 322 to a second edge 324. Each bump foil 320 extends or subtends an arc angle 336 of approximately 110° from the first edge 322 to the second edge 324 in the illustrated example. In other examples, the bump foils 320 may extend greater than or less than 110° around the foil bearing assembly 300, depending, for example, on the number of bump foils 320 included in the bump foil assembly 310.

Figure 17:
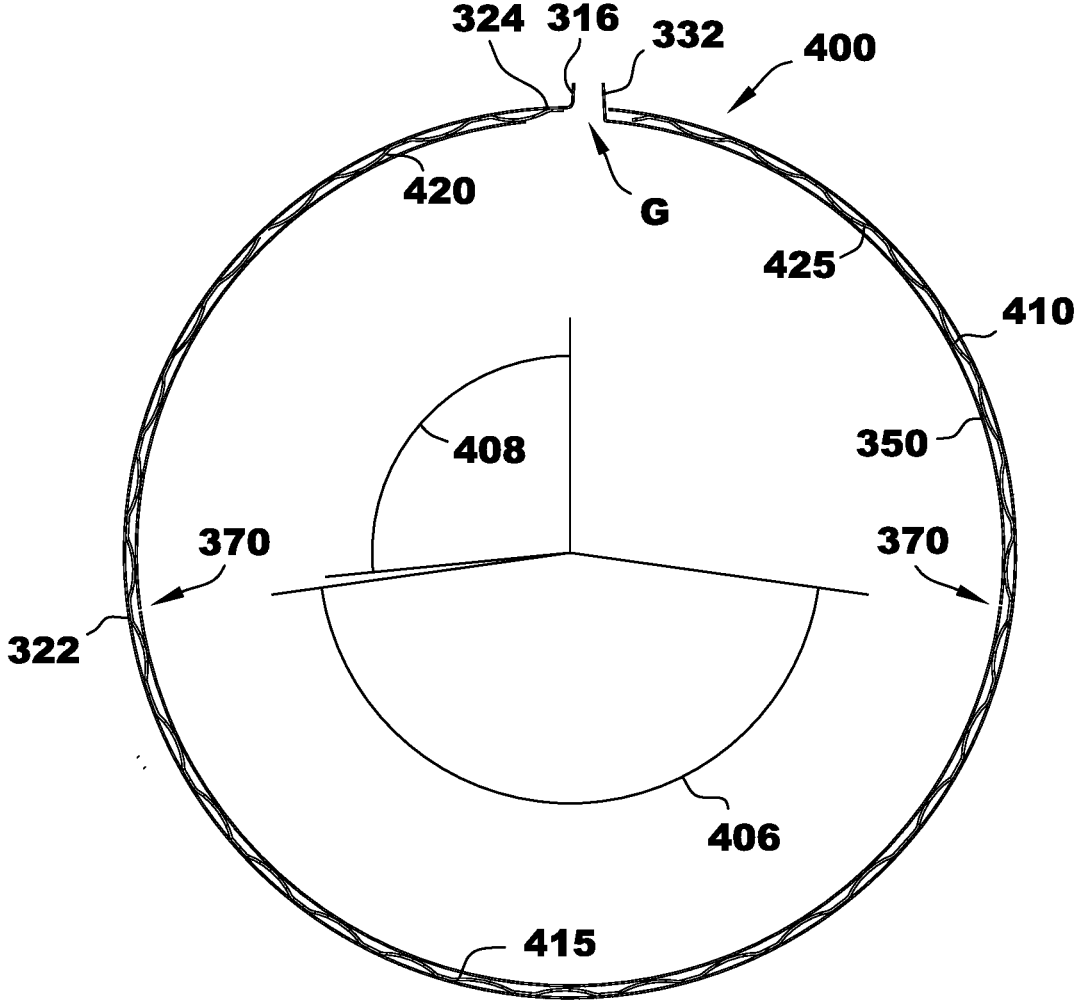
FIG. 17 is a section of another foil bearing assembly suitable for use with the compressor of FIG. 1.

Additionally, the bump foils 320 can have different arc angles from one another. FIG. 17, for example, illustrates a foil bearing assembly 400 including a bump foil assembly 410 with bump foils 415, 420, 425 having different arc angles 406, 408. In particular, the bump foil assembly 410 of FIG. 17 includes a major bump foil 415 that has an arc angle 406 greater than the arc angle 408 of the other bump foils 420, 425. In this example, the major bump foil 415 has an arc angle 406 of approximately 160°, and the other bump foils 420, 425 have arc angles 408 of approximately 95°. In other examples, the major bump foil 415 can have an arc angle 406 in the range of 120° to 360°, in the range of 120° to 270°, in the range of 120° to 240°, in the range of 120° to 200°, in the range of 120° to 180°, in the range of 120° to 150°, in the range of 150° to 360°, in the range of 150° to 270°, in the range of 150° to 240°, in the range of 150° to 200°, or in the range of 150° to 180°. In other examples, the bump foil assembly 310, 410 may include a single bump foil that extends circumferentially around the entirety or substantially the entirety of the foil bearing assembly 300.

The inner foil assembly 306 includes at least one inner foil pad 328, also referred to as an inner foil 328, disposed radially inward from the bump foil assembly 310. In the examples illustrated in FIGS. 1-17, the inner foil assembly 306 includes a single inner foil pad 328 constructed of a single, unitary foil. In other examples, the inner foil assembly 306 may be constructed of multiple inner foil pads spaced circumferentially about the foil bearing assembly 300. In such examples, the inner foil assembly 306 can include any suitable number of inner foil pads that enables the foil bearing assembly 300 to function as described herein. Some such examples are described, for example, in U.S. patent application Ser. No. 17/167,611, filed Feb. 4, 2021, issued as U.S. Pat. No. 11,686,341 on Jun. 27, 2023, the disclosure of which is incorporated by reference in its entirety. Reference made to "inner foil pad" or "inner foil" using singular articles (e.g., "an" or "the") encompasses one inner foil pad 328 or multiple (i.e., two or more) inner foil pads 328 being included in the inner foil assembly 306 unless expressly stated otherwise or the context clearly indicates otherwise. Reference made to an inner foil "assembly" encompasses a single unit inner foil assembly in which components of the inner foil assembly are made integral with one another, and a multi-unit inner foil assembly made of two or more separate components.

The inner foil assembly 306, and more particularly the inner foil 328, is arcuate and extends circumferentially from a first inner foil end 330 to a second inner foil end 334. The inner foil 328 may have a circumferential extent that is approximately 360° or may be less than 360° such that the first and second inner foil ends 330, 334 are spaced apart circumferentially. When the foil bearing assembly 300 is assembled, as shown in FIGS. 15 and 16 for example, the first inner foil end 330 is located proximate the first outer foil end 344 and the second inner foil end 334 is located proximate the second outer foil end 346.

One of the inner foil ends 330, 334 may be secured (e.g., by welding or brazing) to the outer foil 302 proximate the respective outer foil end 344, 346 that includes the anti-rotation tab 316. The other inner foil end 330, 334 extends slightly beyond the outer foil end 344, 346. As described below, the inner foil end 330, 334 that is not secured to the outer foil 302 includes a radially outward projecting, and axially extending, anti-rotation tab 332 that extends through the gap G defined between the outer foil ends 344, 346 and into a bearing assembly locking feature 208 of the bearing housing 200. The inner foil end 330, 334 that includes the anti-rotation tab 332 may facilitate retaining the respectively proximate outer foil end 344, 346 that does not include the anti-rotation tab 316 and which may be free-floating and not secured (e.g., not welded, brazed, or adhered) to any layer of the foil bearing assembly 300.

The inner foil pad 328 defines a cylindrical inner surface 350 disposed for engagement with the surface of the shaft 104. In some examples, the cylindrical inner surface 350 defines perforations 370 extending radially therethrough. The sections shown in FIGS. 15-17 are taken through the perforations 370, as indicated by dashed line 500 in FIG. 20. The perforations 370 extending through the inner foil assembly 306 may facilitate reducing sub-synchronous vibrations, for example, by providing improved damping and reduced cross-coupled stiffness throughout the foil bearing assembly 300, as described for example in U.S. patent application Ser. No. 18/162,396, filed Jan. 31, 2023, issued as U.S. Pat. No. 11,852,153 on Dec. 26, 2023, which is incorporated by reference in its entirety.

Figure 18:
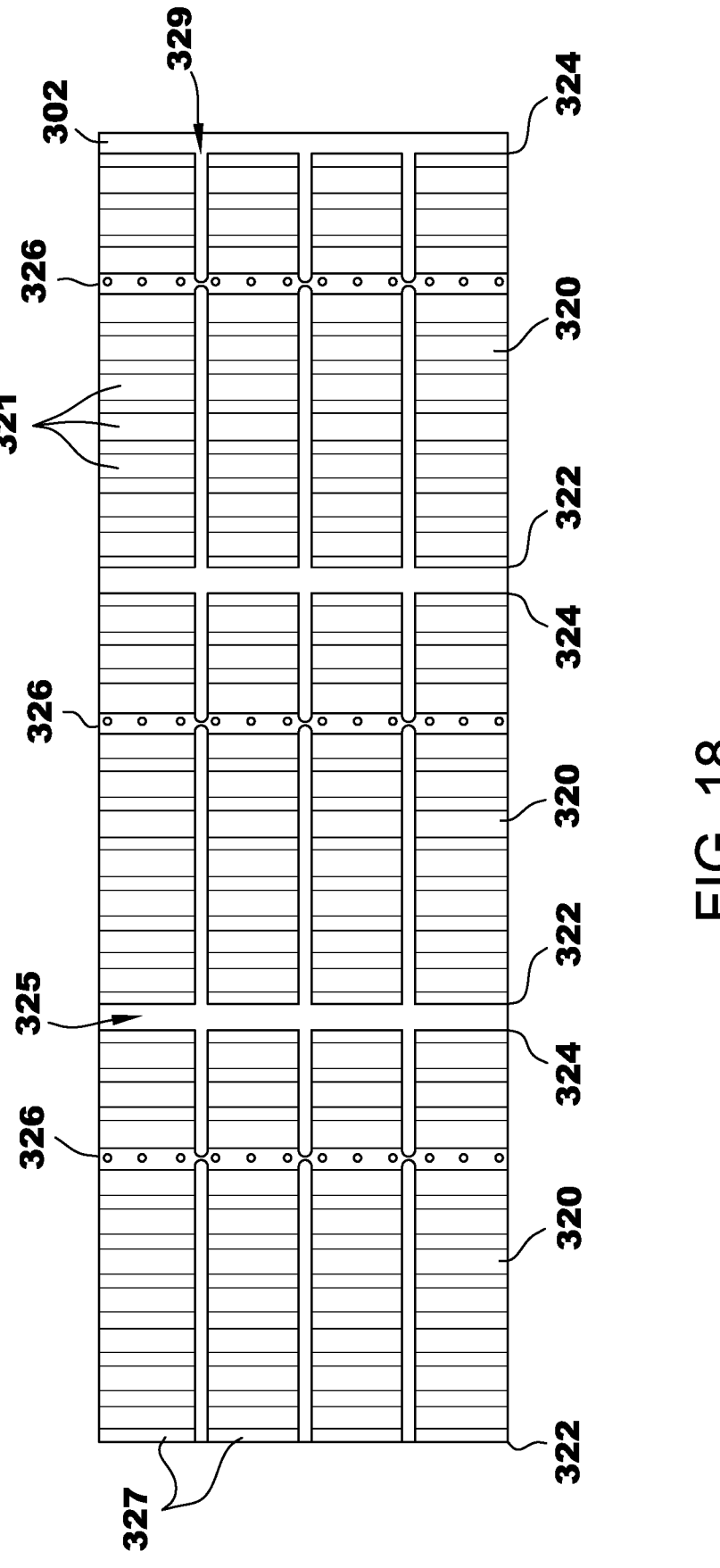
FIG. 18 is an interior view of a bump foil assembly and an outer foil assembly of the foil bearing assembly shown in FIG. 15 prior to being formed into a cylinder.

FIG. 18 is an interior view of the bump foil assembly 310 and the outer foil assembly 302 prior to assembly into the foil bearing assembly 300. Each bump foil 320 is constructed from one or more bump foil strips 327 extending between the first edge 322 and the second edge 324 of the bump foil 320. In the illustrated example, each bump foil 320 is constructed from four bump foil strips 327. In other examples, the bump foils 320 may include any suitable number of bump foil strips 327, for example but without limitation, one, two, three, five, or more bump foil strips 327. Each bump foil strip 327 is spaced axially from the adjacent bump foil strip 327 to define an axial gap 329 therebetween.

Figure 19:
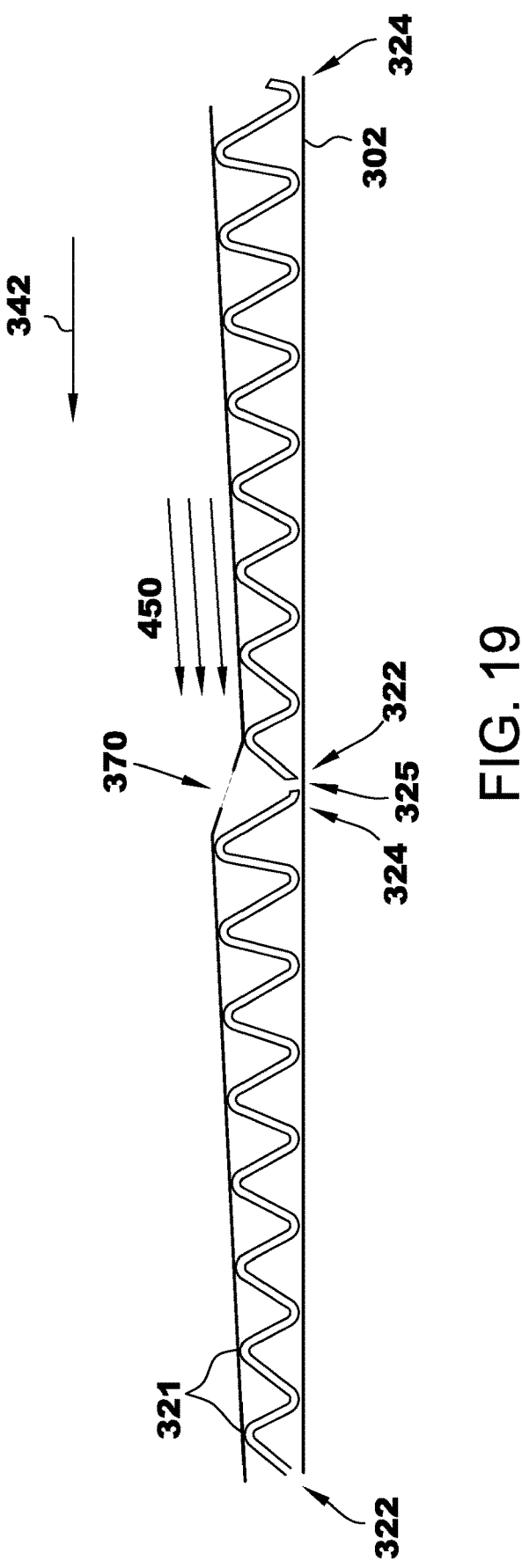
FIG. 19 is a side view of the outer foil assembly, the bump foil assembly, and an inner foil assembly of the foil bearing assembly shown in FIG. 15 prior to being formed into a cylinder.

Each bump foil strip 327 includes bumps 321 disposed between the first edge 322 and the second edge 324. Each bump 321 has a height, measured as a distance the bump extends radially between the outer foil assembly 302 and the inner foil assembly 306. In the illustrated example, as shown in FIG. 19, the bumps 321 increase in height between the first edge 322 and the second edge 324 of the bump foil 320, such that the shortest bump 321 is proximate the first edge 322 and the tallest bump 321 is proximate the second edge 324. In other examples, the heights of the bumps 321 may vary in any other suitable configuration, or, alternatively, each of the bumps 321 may have substantially the same height.

The bumps 321 may increase in height in a direction opposite a direction of rotation of the shaft 104. With reference to FIG. 15, in an example operation of the compressor 100, the shaft 104 rotates about a rotational axis of the shaft 104 in a first rotational direction 342. For each bump foil 320, the bumps 321 increase in height in a second rotational direction 343 opposite the first direction 342, from the first edge 322 to the second edge 324 of the bump foil 320. In other examples, for each bump foil 320, the bumps 321 may increase in height in the same direction as the direction of rotation of the shaft 104 (e.g., the first rotational direction 342). In some examples, for each bump foil 320, the bumps 321 may increase in height in both rotational directions 342, 343, with a tallest bump 321 being located a number of bumps 321 (e.g., one or more bumps 321) inboard of both the first edge 322 and the second edge 324. In such examples, the number of bumps 321 between the tallest bump 321 and the first edge 322 may be the same as or different from the number of bumps 321 between the tallest bump 321 and the second edge 324.

Each bump foil 320 includes an axially extending land 326 located between the first edge 322 and the second edge 324. The bump foils 320 are secured to one or both of the outer foil assembly 302 and the inner foil assembly 306 at the lands 326. In some examples, each of the bump foils 320 is welded or brazed to the outer foil assembly 302 along a respective land 326, such that each respective land 326 interconnects the bump foil strips 327 of each bump foil 320. Other suitable techniques, such as adhering using adhesives, may additionally or alternatively be used to secure the bump foils 320 to one or both of the outer foil assembly 302 and the inner foil assembly 306 at the lands 326. The lands 326 may be located a number of bumps 321 inboard of the each of the first each 322 and the second edge 324. The example illustrated in FIG. 18 shows bump foils 320 with seven bumps 321 to the left of the land 326 and three bumps 321 to the right of the land 326. Other examples may have any number of bumps on either side of the land 326, or zero bumps on one of the sides of the land 326, to enable the foil bearing assembly 300 to function as described.

Figure 20:
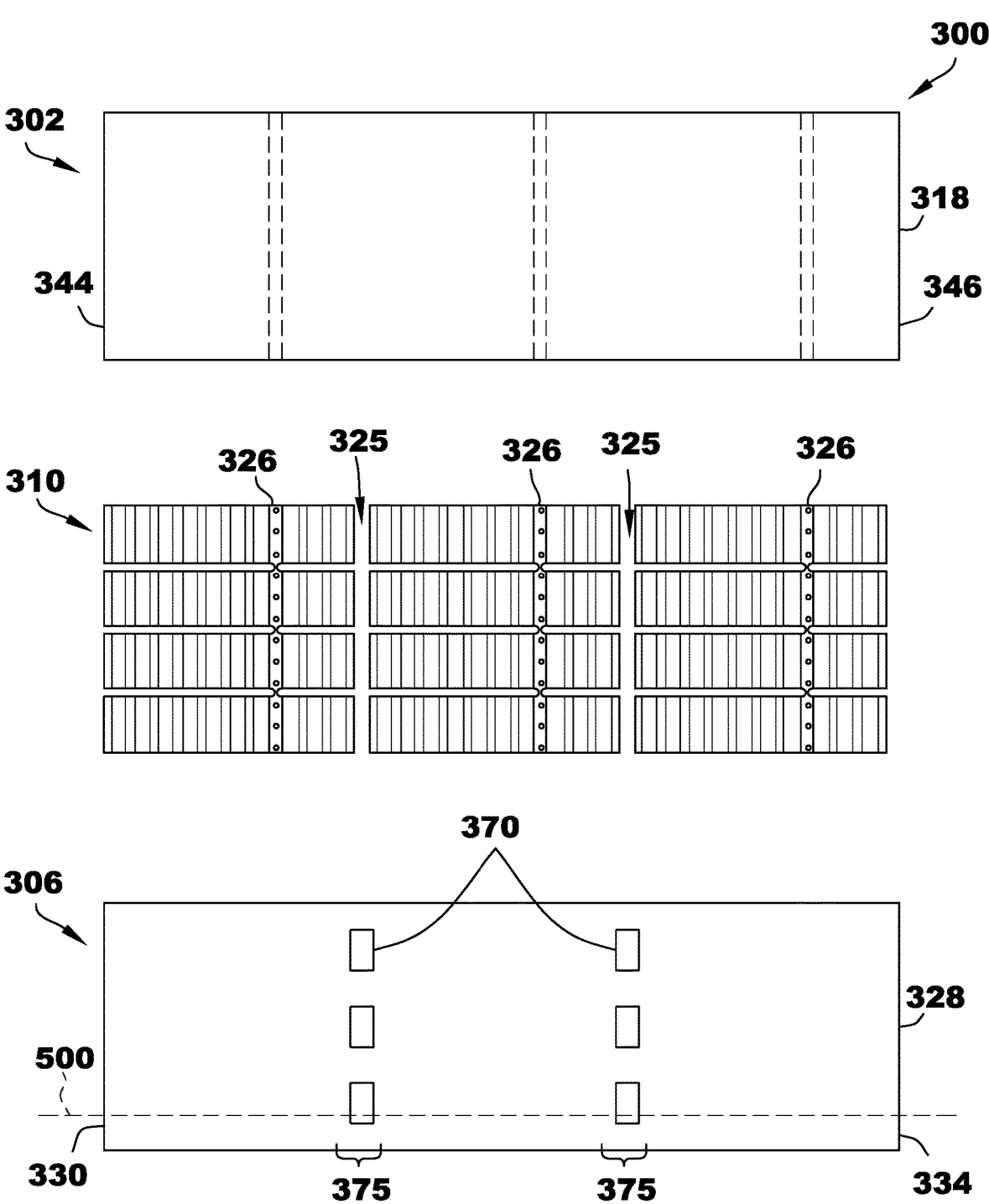
FIG. 20 is an interior view of the outer foil assembly, the bump foil assembly, and the inner foil assembly of the foil bearing assembly shown in FIG. 15, prior to assembly, illustrating perforations formed along the inner foil assembly.

FIG. 20 is an interior view of the foil bearing assembly 300 prior to assembly. During assembly of the foil bearing assembly 300, the three foil assemblies 302, 310, 306 are axially aligned and formed into a cylinder. FIG. 20 illustrates each of the three foil assemblies 302, 310, 306 at a different axial position for clarity. The outer foil assembly 302 includes the outer foil 318 extending from the first outer foil end 344 to the second outer foil end 346. A portion of the outer foil 318 proximate the first outer foil end 344 or the second outer foil end 346 may be bent in an L-shape to define an anti-rotation tab 316, described below. Alternatively, the anti-rotation tab 316 may be separately secured to the first outer foil end 344 or the second outer foil end 346 and extends radially outward therefrom. The bump foil assembly 310 is positioned between the outer foil assembly 302 and the inner foil assembly 306 and includes three bump foils 320. As installed, the bump foil assembly 310 is disposed circumferentially about the inner foil assembly 306. Each bump foil 320 may be spaced circumferentially from the adjacent bump foil 320 to define a gap 325 therebetween. The inner foil assembly 306 includes the inner foil 328 disposed radially inward from the outer foil assembly 302 and the bump foil assembly 310. The inner foil 328 extends from the first inner foil end 330 to the second inner foil end 334. A portion of the inner foil 328 proximate the first inner foil end 330 or the second inner foil end 334 may be bent in an L-shape to define an anti-rotation tab 332, described below. Alternatively, the anti-rotation tab 332 may be separately secured to the first inner foil end 330 or the second inner foil end 334 and extends radially outward therefrom. As described below, the anti-rotation tab 332 is located at the inner foil end 330, 334 opposite the outer foil end 344, 346 at which the anti-rotation tab 316 is located.

The cylindrical inner surface 350 of the inner foil assembly 306 extends from a first axial edge of the inner foil assembly 306 to an opposite second axial edge of the inner foil assembly 306. As noted above, the cylindrical inner surface 350 defines the perforations 370 extending radially therethrough. Each perforation 370 is radially aligned with one of the gaps 325 between adjacent bump foils 320, and axially aligned with one of the axial gaps 329 between adjacent bump foil strips 327.

The perforations 370 may include at least one subset 375 of perforations 370, where each perforation 370 in the subset 375 is axially aligned with the other perforations 370 of the subset 375. The example illustrated in FIG. 20 includes two subsets 375 of axially aligned perforations 370. In other examples more than or fewer than two subsets 375 of axially aligned perforations 370 may be included. Additionally, in the illustrated example, each subset 375 includes three axially aligned perforations 370. In other examples, one or more of the subsets 375 may include more than or fewer than three perforations 370, such as one perforation, two perforations, four perforations, five perforations, or six or more perforations. The illustrated example includes a total of six perforations 370, although other examples may include more than or fewer than six perforations 370.

Figure 21:
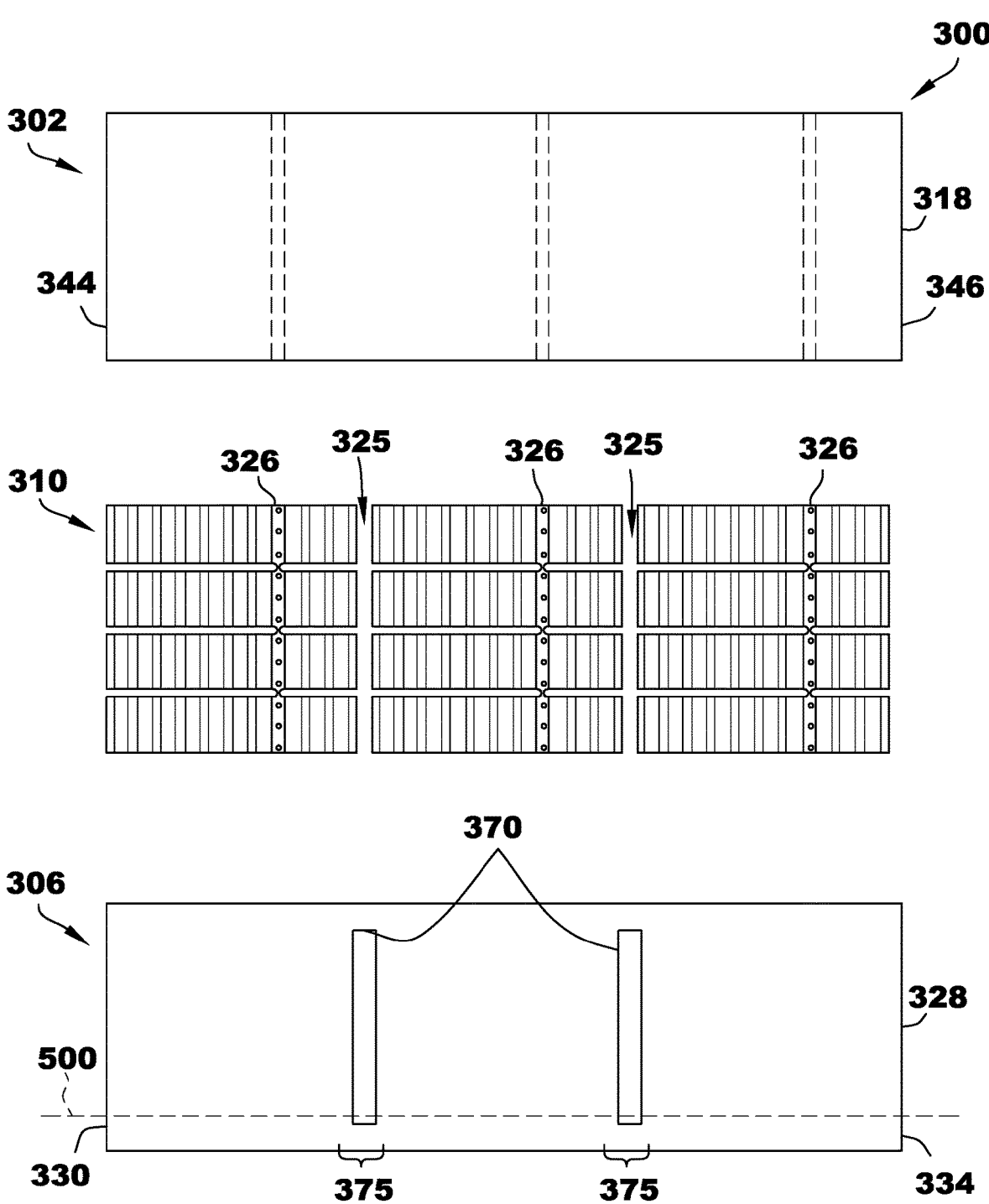
FIG. 21 is an interior view of the outer foil assembly, the bump foil assembly, and the inner foil assembly of the foil bearing assembly shown in FIG. 15, prior to assembly, illustrating an additional or alternative configuration of the perforations formed along the inner foil assembly.

In another example, shown in FIG. 21, the inner foil 328 includes two subsets 375 of perforations 370, each subset having one axial-extending perforation 370. Each perforation 370 in this example is radially aligned with one of the gaps 325 defined between adjacent bump foils 320, and axially aligned with all three axial gaps 329. In some examples, including those shown in FIGS. 20 and 21, each of the gaps 325 defined between adjacent bump foils 320 is radially aligned with one subset 375 of perforations 370.

In other examples, the perforations 370 may be located along the inner foil assembly 306 at a location other than radially aligned with one of the gaps 325 between adjacent bump foils 320. For example, in addition to or as an alternative to being radially aligned with gaps 325 between the bump foils 320, the perforations 370 may be radially aligned with the lands 326 of bump foils 320. In such examples, each subset 375 is radially aligned with one of the lands 326, and the land 326 of each bump foil 320 is radially aligned with one subset 375 of perforations 370.

Each of the perforations 370 may have any suitable size and shape that enables the foil bearing assembly 300 to function as described herein. The perforations 370 may each have the same shape. Alternatively, different perforations 370 may have different shapes. In some examples, the shape of each of the perforations 370 is at least partially polygonal, including for example and without limitation, a rectangle, a triangle, a rhombus, or any other at least partially polygonal shape that enables the foil bearing assembly 300 to function as described. In other examples, the shapes of the perforations 370 may be fully or partially rounded, such as a circle, oval, teardrop, or any other fully or partially rounded shape that enables the foil bearing assembly 300 to function as described.

The perforations 370 defined along the cylindrical inner surface 350 of the inner foil assembly 306 may facilitate reducing sub-synchronous vibrations within centrifugal compressors by providing improved damping and reduced cross-coupled stiffness, for example, by introducing axially extending discontinuities along the cylindrical inner surface 350. For example, the perforations 370 defined along the cylindrical inner surface 350 of the inner foil assembly 306 are perpendicular to a film of fluid (indicated by arrow 450 in FIG. 19) swirling circumferentially around the shaft 104, and thereby disrupt the swirling flow of the fluid film 450 and introduce fresh gas into the bearing assembly 300. The fluid film 450 includes gas refrigerant in the illustrated compressor 100. In other examples, and more particularly in other types of turbomachines with which the foil bearing assembly 300 is used, the fluid film may include another type of working fluid (e.g., air or other gas) depending on the type of turbomachine. Disrupting the otherwise continuous circumferential flow provides cooling and reduces cross-coupling within the foil bearing assembly 300. The polygonal shape and sharp corners of each perforation 370 may also generate additional turbulence to disrupt the swirling fluid film 450. Drawing additional gas into the bearing film further reduces the risk of bearing starvation, and doing so without a pump reduces the complexity, weight, and cost of the bearing.

The perforations 370 additionally allow gas to flow beneath the bump foil assembly 310 and reach every layer of the foil bearing assembly 300, and in particular, allow gas to flow beneath each bump foil 320, and into contact with the outer foil assembly 302. This provides cooling between each layer of the foil bearing assembly 300 and provides improved damping and reduced cross-coupled stiffness to the bearing as a whole. Referring to FIG. 19, aligning the perforations 370 with the gaps 325 between adjacent bump foils 320 advantageously places the perforations 370 between the tallest bump 321 at the second edge 324 of a bump foil 320 and the shortest bump 321 at the first end of the adjacent bump foil 320. In an example operation, the pressure generated by the hydrodynamic film causes the inner foil assembly to deflect outward and into engagement with the outer peak of each bump 321. Because the bump foils 320 vary in height, the cylindrical inner surface 350 is deflected into a non-cylindrical shape. When the shaft 104 rotates in the first direction 342 shown in FIG. 15, the perforations 370 are oriented obliquely relative to the first direction 342, and thus angled in the direction of the swirling hydrodynamic film 450 generated by the shaft 104, making it easier for the film 450 to flow through the perforation 370 and facilitating its disruption.

Referring to FIGS. 15 and 16, the outer foil assembly 302 includes the anti-rotation tab 316 at one of the first outer foil end 344 or the second outer foil end 346. In the illustrated example, the anti-rotation tab 316 is located at the first outer foil end 344. When the foil bearing assembly 300 is assembled, the anti-rotation tab 316 projects radially outward from the outer foil 318. The anti-rotation tab 316 also extends axially between the axial ends of the foil bearing assembly 300. The anti-rotation tab 316 may be made integral with the outer foil 318 or may be attached to the outer foil 318 at the first outer foil end 344 or the second outer foil end 346. In examples where the anti-rotation tab 316 is made integral with the outer foil 318, the anti-rotation tab 316 may be defined by an L-shaped bend at the first outer foil end 344 or the second outer foil end 346.

The inner foil assembly 306 includes the anti-rotation tab 332 at one of the first inner foil end 330 or the second inner foil end 334. The anti-rotation tab 332 of the inner foil assembly 306 is located at the opposite inner foil end 330, 334 of the outer foil end 344, 346 at which the anti-rotation tab 316 is located. In the illustrated example, the anti-rotation tab 316 is located at the first outer foil end 344 and the anti-rotation tab 332 is located at the second inner foil end 334. Alternatively, the anti-rotation tab 316 may be located at the second outer foil end 346 and the anti-rotation tab 332 is located at the first inner foil end 330. When the foil bearing assembly 300 is assembled, like the anti-rotation tab 316, the anti-rotation tab 332 projects radially outward from the inner foil 328. The anti-rotation tab 332 also extends axially between the axial ends of the foil bearing assembly 300. The anti-rotation tab 332 may be made integral with the inner foil 328 or may be attached to the inner foil 328 at the first inner foil end 330 or the second inner foil end 334. In examples where the anti-rotation tab 332 is made integral with the inner foil 328, the anti-rotation tab 332 may be defined by an L-shaped bend at the first inner foil end 330 or the second inner foil end 334.

The anti-rotation tabs 316 and 332 are located at opposite circumferential ends of the outer foil 318 and the inner foil 328, respectively, to facilitate bidirectional anti-rotation (i.e., limiting or inhibiting rotation or circumferential movement in both rotational directions 342, 343) of the foil bearing assembly 300. In particular, depending on the outer foil end 344, 346 at which the anti-rotation tab 316 is located and the inner foil end 330, 334 at which the anti-rotation tab 332 is located, the anti-rotation tab 316 facilitates limiting or inhibiting movement of the foil bearing assembly 300 in the first rotational direction 342 or the second rotational direction 343 and the anti-rotation tab 332 facilitates limiting or inhibiting movement of the foil bearing assembly 300 in the other rotational direction 342, 343. The bidirectional anti-rotation of the foil bearing assembly 300 also facilitates limiting or preventing one or more of the foils or layers of the foil bearing assembly 300 (e.g., the inner foil assembly 306) from moving axially (or "telescoping") relative to the bearing housing 200 during rotation of the shaft 104.

The inner foil assembly 306, and more particularly the inner foil 328, is also secured within the foil bearing assembly 300, that is, secured to at least one adjacent layer of the foil bearing assembly 300. In particular, the inner foil 328 is secured to the outer foil 318. In some examples, the inner foil 328 is secured to the outer foil 318 by welding or brazing. Other suitable techniques, such as adhering using adhesives, may additionally or alternatively be used. Securing the inner foil 328 within the foil bearing assembly 300, for example, to the outer foil 318, may facilitate further limiting or preventing axial movement of the inner foil assembly 306 relative to the bearing housing 200 during rotation of the shaft 104, in addition to the anti-rotation tabs 316, 332.

The inner foil 328 may be secured (e.g., by welding or brazing) to the outer foil 318 proximate the outer foil end 344, 346 at which the anti-rotation tab 316 is located. That is, the inner foil end 330, 334 that does not include the anti-rotation tab 332 is secured to the outer foil 318 at the outer foil end 344, 346 that includes the anti-rotation tab 316. In the illustrated example, shown in FIGS. 15 and 16 for example, the first inner foil end 330 is secured (e.g., by welding or brazing) to the first outer foil end 344 at which the anti-rotation tab 316 is located, and the second inner foil end 334 includes the anti-rotation tab 332.

The second outer foil end 346 may be free-floating and not secured to the second inner foil end 334. This may be desired to simplify assembly and/or installation of the foil bearing assembly 300, and/or reduce thermal loads on the foil layers of the foil bearing assembly 300. Free-floating ends can also improve damping characteristics of the foil bearing assembly 300, for example, by allowing greater deflection or freedom of movement one or more of the foil layers. Free-floating ends of the inner and outer foils 328, 318 may be susceptible to axial movement (i.e., telescoping) relative to the bearing housing 200 during operation of the compressor 100 and rotation of the shaft 104. Axial movement of the free ends can negatively impact function of the foil bearing assembly 300, by reducing load capability for example, and can lead to compressor damage. Advantageously, the second outer foil end 346 is interposed between the second inner foil end 334 and the radial inner surface 204 and retained by engagement of the anti-rotation tab 332 and the bearing assembly locking feature 208, described below. In this way, both the inner foil 328 and the outer foil 318 may be retained at both of the respective circumferential ends 330, 334 and 344, 346 within the cylindrical bore 206. This facilitates reducing or eliminating the opportunity for movement of the foil bearing assembly 300 relative to the bearing housing 200 and, thereby, the opportunity for the negative impacts of such movement on bearing function and compressor operation.

In other examples, the second outer foil end 346, and/or another portion of the outer foil 318, may be secured to another layer of the foil bearing assembly 300. For example, the second outer foil end 346 may be secured (e.g., by welding or brazing) to the second inner foil end 334.

The anti-rotation tabs 316 and 332 cooperatively form a bearing retention feature 304 of the foil bearing assembly 300 that is received by the bearing assembly locking feature 208 of the bearing housing 200. The anti-rotation tab 316 that is included in the outer foil assembly 302 is not impeded by any radially outer layers of the foil bearing assembly 300, but the anti-rotation tab 332 that is included in inner foil assembly 306 may be impeded by radially outer layers such as the outer foil assembly 302. The gap G that is defined between the first outer foil end 344 and the second outer foil end 346 is radially aligned with the bearing assembly locking feature 208, and allows the anti-rotation tab 332 of the inner foil assembly 306 to extend therethrough and into the bearing assembly locking feature 208. The inner foil end 330, 334 that includes the anti-rotation tab 332 also extends slightly beyond the respectively proximate outer foil end 344, 346 to allow the anti-rotation tab 332 to extend through the gap G. During operation of the compressor 100 and rotation of the shaft 104, the bearing retention feature 304 (i.e., the anti-rotation tabs 316, 332) engages with the bearing assembly locking feature 208 to limit or inhibit movement (e.g., rotation) of the foil bearing assembly 300 within the cylindrical bore 206.

The bearing retention feature 304 extends axially to complement and correspond to an axial extent of the bearing assembly locking feature 208. In the illustrated example, the bearing retention feature 304 (i.e., the anti-rotation tabs 316, 332) extends the entire axial length or substantially the entire axial length of the foil bearing assembly 300. In other examples, the bearing retention feature 304 may terminate axially prior to one or both axial ends of the foil bearing assembly 300. The anti-rotation tabs 316, 332 may extend different axial lengths in such examples. In some examples, the bearing retention feature 304 may include discrete segments (e.g., discrete tabs) disposed axially along the inner surface 204. In such examples, each of the anti-rotation tabs 316, 332 may be formed by discrete L-shaped bends or as multiple tab segments each secured to the one outer foil end 344, 346 and the one inner foil end 330, 334 and spaced axially from adjacent tab segments.

Referring to FIG. 14, the bearing assembly locking feature 208 is defined in the radial inner surface 204 of the bearing housing 200. The bearing assembly locking feature 208 is a slot (e.g., a groove or a keyway) defined by a radial depression within the radial inner surface 204 such as illustrated in FIG. 14. In this description, the bearing assembly locking feature 208 is also referred to as a slot 208.

The size and shape of the slot 208 may vary to complement a size and shape of the bearing retention feature 304 (i.e., the anti-rotation tabs 316, 332). In the illustrated example, the slot 208 is rectangular in shape and defines two walls 224, 226 (FIG. 10) that act as circumferential load surfaces for engagement with the anti-rotation tabs 316, 332. The slot 208 also extends a radial depth, which determines the radial height of the walls 224, 226. The depth of the slot 208 is greater than a radial height of each of the anti-rotation tabs 316, 332, to enable the anti-rotation tabs 316, 332 to be received in the slot 208 with sufficient clearance.

The slot 208 extends axially along the radial inner surface 204. In the illustrated example, the slot 208 extends the entire axial length or substantially the entire axial length of the cylindrical bore 206. In other examples, the slot 208 may terminate axially prior to one or both axial ends of the cylindrical bore 206. In some examples, the slot 208 may include discrete segments (e.g., discrete grooves or keyways) extending axially along the inner surface 204. The axial extent of the slot 208 may vary depending on the axial extent of the bearing retention feature 304.

In the illustrated example, the foil bearing assembly 300 includes one bearing retention feature 304 and one corresponding slot 208. Both anti-rotation tabs 316, 332 of the bearing retention feature 304 are received by the slot 208. In other examples, the foil bearing assembly 300 may include multiple bearing retention features 304 and multiple corresponding slots 208. For example, the foil bearing assembly 300 may include two, three, four, or more than five bearing retention features 304 and corresponding slots 208. In such examples, the bearing retention features 304 and slots 208 are at corresponding angular locations such that each bearing retention feature 304 interlocks with a slot 208. Any number of bearing retention features 304 and slots 208 may be included to enable the foil bearing assembly 300 to function as described.

In examples where the foil bearing assembly 300 includes multiple bearing retention features 304 and multiple corresponding slots 208, each bearing retention feature 304 includes an anti-rotation tab 316 of the outer foil assembly 302 and an anti-rotation tab 332 of the inner foil assembly 306. For each bearing retention feature 304, both tabs 316, 332 are received by the corresponding slot 208. In these examples, the outer foil assembly 302 includes multiple outer foils 318 and the inner foil assembly 306 includes multiple inner foils 328. Each outer foil 318 and each inner foil 328 is arcuate and extends between two circumferential ends. For each pair of adjacent outer foils 318, the adjacent circumferential ends of the two outer foils 318 are spaced to define the gap G between the adjacent pair which is radially aligned with the corresponding slot 208. For each outer foil 318, one of the circumferential ends of the outer foil 318 includes the anti-rotation tab 316 and the other circumferential end does not include an anti-rotation tab and may be free-floating. For each inner foil 328, one of the circumferential ends includes the anti-rotation tab 316 and the other circumferential end does not include an anti-rotation tab. Each outer foil 318 may correspond to one of inner foils 328, having an approximately equal arcuate extent and angular location. For each pair of an outer foil 318 and a corresponding inner foil 328, the circumferential end of the outer foil 318 that includes the anti-rotation tab 316 is proximate the circumferential end of the inner foil 328 that does not include the anti-rotation tab 332 (and these ends may be secured, e.g., by brazing or welding), and the circumferential end of the inner foil 328 that includes the anti-rotation tab 332 is proximate the circumferential end of the outer foil 318 that does not include the anti-rotation tab 316. The bearing retention features 304 are formed by a circumferentially adjacent anti-rotation tab 316 and anti-rotation tab 332, and located at an angular position corresponding to one of the slots 208.

In an example operation of the compressor 100, the shaft 104 is rotated in the first rotational direction 342, which translates to rotation of the impellers 106 and 116 to impart kinetic energy to refrigerant entering into the respective compression stages 124, 126. The fluid film 450 is generated and swirls between the foil bearing assembly 300 and the shaft 104 to rotatably support the shaft 104. Forces acting on the foil bearing assembly 300 via the rotating shaft 104 and/or swirling fluid film 450 create the opportunity for circumferential and/or axial movement of one or more of the foil layers of the foil bearing assembly 300 relative to the bearing housing 200. The anti-rotation tab 316 of the outer foil assembly 302 engages with the wall 224 defined by the slot 208, which limits or inhibits circumferential movement of the foil bearing assembly 300, and more particularly the outer foil 318, in the first rotational direction 342. Engagement between the anti-rotation tab 316 and the wall 224 also limits or inhibits circumferential movement of the inner foil 328 in the first rotational direction 342 as the first inner foil end 330 is secured (e.g., welded or brazed) to the first outer foil end 344. The anti-rotation tab 332 of the inner foil assembly 306 engages with the wall 226 defined by the slot 208, which limits or inhibits circumferential movement of the foil bearing assembly 300, and more particularly the inner foil 328, in the second rotational direction 343. Engagement between the anti-rotation tab 332 and the wall 226 also limits or inhibits circumferential movement of the outer foil 318 in the second rotational direction 343 as the second outer foil end 346 is retained between the anti-rotation tab 332, the inner foil 328, and the radial inner surface 204 of the bearing housing 200.

Axial movement (i.e., telescoping) of the foil layers of the foil bearing assembly 300, and more particularly the inner foil 328 and the outer foil 318, is also limited or inhibited by the engagement between the anti-rotation tabs 316, 332 and the walls 226, 224, respectively, since the anti-rotation forces are balanced at the two circumferential ends of the foil bearing assembly 300. The securement of the first inner foil end 330 to the first outer foil end 344 and the retainment of second outer foil end 346 between the anti-rotation tab 332, the inner foil 328, and the radial inner surface 204 may further facilitate limiting axial movement at these circumferential ends. In some examples, axial retainers (e.g., the foil retaining lip 214, the foil keepers 312*a*, 312*b*, and/or the foil retaining clips 314*a*, 314*b*) may also be used to maintain the axial position of the foil bearing assembly 300 within the cylindrical bore 206, and to limit or inhibit axial movement of one or more foil layers of the foil bearing assembly 300 relative to the bearing housing 200.

The bearing housing and foil bearing assemblies of the present disclosure may be used as part of a method of assembling a turbomachine, such as a compressor, turbocharger, turbine engine, and the like. The assembly method includes mounting the bearing housing to a housing of the turbomachine using the mounting structure of the bearing housing as described above. The assembly method also includes inserting a foil bearing assembly into the cylindrical bore and connecting the foil bearing assembly to the bearing housing by cooperatively engaging a bearing retention feature of the foil bearing assembly with the bearing assembly locking feature to maintain the foil bearing assembly within the bearing housing at a fixed rotational position as described above. In some embodiments, connecting the foil bearing assembly to the bearing housing includes connecting separate pad modules, each having a separate bearing retention feature, to the bearing housing. The method may further include positioning the foil bearing assembly within the cylindrical bore adjacent a retainer, or between two retainers, that facilitates maintaining an axial position of and limiting or inhibiting axial movement of the foil bearing assembly relative to the bearing housing. For example, the method may include inserting at least one foil retaining clip into a circumferential groove formed within the inner surface of the cylindrical bore to retain the foil bearing assembly in a fixed axial position with respect to the cylindrical bore.

Embodiments of the systems and methods described achieve desired results as compared to prior systems and methods. For example, embodiments of the bearing systems facilitate reducing or eliminating the propensity for circumferential and axial movement of a foil bearing assembly relative to a bearing housing. This prevents losses in the load capability of the foil bearing assembly and otherwise reduces the opportunity for operational error and compressor damage.

Example embodiments of bearing systems and methods, such as refrigerant compressors that incorporate the disclosed bearing system and methods of assembling compressors that include the disclosed bearing assembly, are described above in detail. The systems and methods are not limited to the specific embodiments described herein, but rather, components of the system and methods may be used independently and separately from other components described herein. For example, the bearing housing and bearing assemblies described above may be used in compressors other than centrifugal compressors. The bearing housing and bearing assemblies may also be used in compressors other than refrigerant compressors, such as turbocharger compressors and the like, as well as other turbomachines, such as turbine engines, turbochargers, and the like.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, all matter contained in the above description and shown in the accompanying drawing(s) shall be interpreted as illustrative and not in a limiting sense.

What is claimed is:

1. A bearing system comprising:

a bearing housing having an inner surface defining a cylindrical bore, and a slot defined in the inner surface; and a foil bearing assembly positioned within the cylindrical bore, the foil bearing assembly comprising:

an outer foil assembly comprising an outer foil extending circumferentially from a first outer foil end to a second outer foil end, and a first anti-rotation tab at the first outer foil end that is received by the slot to limit circumferential movement of the outer foil relative to the bearing housing in a first direction;

a bump foil assembly positioned radially inward of the outer foil; and an inner foil assembly positioned radially inward of the bump foil assembly and secured to the outer foil, the inner foil assembly comprising an inner foil extending circumferentially from a first inner foil end to a second inner foil end, and a second anti-rotation tab at the second inner foil end that is received by the slot to limit circumferential movement of the inner foil relative to the bearing housing in a second direction opposite the first direction, wherein the first inner foil end is attached to the outer foil proximate the first outer foil end by welding or brazing.

2. The bearing system of claim 1, wherein the first outer foil end and the second outer foil end define a gap therebetween, the gap being radially aligned with the slot to allow the second anti-rotation tab of the inner foil to extend through the gap and into the slot.

3. The bearing system of claim 1, wherein the first and second anti-rotation tabs are defined by an L-shaped bend at the first outer foil end and the second inner foil end, respectively.

4. The bearing system of claim 1, wherein the foil bearing assembly extends between two axial ends and the bearing system further comprises retainers each positioned at one of the axial ends of the foil bearing assembly to limit axial movement of the foil bearing assembly relative to the bearing housing.

5. The bearing system of claim 4, wherein the retainers comprise foil retaining clips removably connected to the bearing housing.

6. The bearing system of claim 1, wherein the bump foil assembly includes at least one bump foil disposed circumferentially about the inner foil and each of the at least one bump foil has bumps that increase in height along an extent of the bump foil in one of the first direction and the second direction.

7. A foil bearing assembly comprising:
an outer foil assembly comprising an outer foil extending circumferentially from a first outer foil end to a second outer foil end, and a first anti-rotation tab at the first outer foil end;
a bump foil assembly positioned radially inward of the outer foil; and
an inner foil assembly positioned radially inward of the bump foil assembly, the inner foil assembly comprising an inner foil extending circumferentially from a first inner foil end to a second inner foil end, and a second anti-rotation tab at the second inner foil end, wherein the first inner foil end is attached to the outer foil proximate the first outer foil end by welding or brazing.

8. The foil bearing assembly of claim 7, wherein the first outer foil end and the second outer foil end define a gap therebetween, wherein the second anti-rotation tab of the inner foil extends through the gap.

9. The foil bearing assembly of claim 7, wherein the first and second anti-rotation tabs are defined by an L-shaped bend at the first outer foil end and the second inner foil end, respectively.

10. The foil bearing assembly of claim 7, wherein the bump foil assembly includes at least one bump foil disposed circumferentially about the inner foil and each of the at least one bump foil has bumps that increase in height along an extent of the bump foil.

11. A compressor comprising:
a compressor housing;
a shaft rotatably supported within the compressor housing;
an impeller connected to the shaft;
a bearing housing mounted within the compressor housing, the bearing housing having an inner surface defining a cylindrical bore through which the shaft extends, and a slot defined in the inner surface; and a foil bearing assembly positioned within the cylindrical bore radially outward of the shaft, the foil bearing assembly comprising:
an outer foil assembly comprising an outer foil extending circumferentially from a first outer foil end to a second outer foil end, and a first anti-rotation tab at the first outer foil end that is received by the slot to limit circumferential movement of the outer foil relative to the bearing housing in a first direction;
a bump foil assembly positioned radially inward of the outer foil; and
an inner foil assembly positioned radially inward of the bump foil assembly and secured to the outer foil, the inner foil assembly comprising an inner foil extending circumferentially from a first inner foil end to a second inner foil end, and a second anti-rotation tab at the second inner foil end that is received by the slot to limit circumferential movement of the inner foil relative to the bearing housing in a second direction opposite the first direction, wherein the first inner foil end is attached to the outer foil proximate the first outer foil end by welding or brazing.

12. The compressor of claim 11, wherein the first outer foil end and the second outer foil end define a gap therebetween, the gap being radially aligned with the slot to allow the second anti-rotation tab of the inner foil to extend through the gap and into the slot.

13. The compressor of claim 11, wherein the first and second anti-rotation tabs are defined by an L-shaped bend at the first outer foil end and the second inner foil end, respectively.

14. The compressor of claim 11, wherein the foil bearing assembly extends between two axial ends and a retainer is positioned at each one of the axial ends of the foil bearing assembly to limit axial movement of the foil bearing assembly relative to the bearing housing.

15. The compressor of claim 14, wherein the retainers comprise foil retaining clips removably connected to the bearing housing.

* * * * *